(12) United States Patent
Egi et al.

(10) Patent No.: US 7,804,559 B2
(45) Date of Patent: Sep. 28, 2010

(54) DISPLAY DEVICE

(75) Inventors: Yuji Egi, Kanagawa (JP); Tetsuji Ishitani, Kanagawa (JP); Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 885 days.

(21) Appl. No.: 11/613,654

(22) Filed: Dec. 20, 2006

(65) Prior Publication Data

US 2007/0146579 A1    Jun. 28, 2007

(30) Foreign Application Priority Data

Dec. 28, 2005    (JP)    ............... 2005-380220

(51) Int. Cl.
*G02F 1/1335* (2006.01)

(52) U.S. Cl. ....................... 349/96; 349/103

(58) Field of Classification Search ............. 349/96–97, 349/103

See application file for complete search history.

(56) References Cited

U.S. PATENT DOCUMENTS

| 4,068,926 | A | * | 1/1978 | Nakamura et al. | ............ 349/97 |
|---|---|---|---|---|---|
| 4,968,120 | A | | 11/1990 | Depp et al. | |
| 5,305,143 | A | | 4/1994 | Taga et al. | |
| 5,583,677 | A | | 12/1996 | Ito et al. | |
| 6,577,361 | B1 | | 6/2003 | Sekiguchi et al. | |
| 6,897,916 | B2 | | 5/2005 | Hamamoto | |
| 6,970,218 | B2 | | 11/2005 | Fukuda et al. | |
| 7,161,185 | B2 | | 1/2007 | Yamazaki et al. | |
| 7,175,898 | B2 | | 2/2007 | Lühmann et al. | |
| 7,375,464 | B2 | | 5/2008 | Chin et al. | |
| 2002/0186469 | A1 | | 12/2002 | Kawazu et al. | |
| 2003/0053011 | A1 | | 3/2003 | Mori | |
| 2004/0141122 | A1 | | 7/2004 | Nakagawa | |
| 2004/0146663 | A1 | | 7/2004 | Paukshto et al. | |
| 2004/0239658 | A1 | | 12/2004 | Koyama et al. | |
| 2004/0245529 | A1 | | 12/2004 | Yamazaki et al. | |
| 2004/0251823 | A1 | | 12/2004 | Park et al. | |
| 2004/0263056 | A1 | | 12/2004 | Seo et al. | |
| 2004/0263066 | A1 | | 12/2004 | Abe et al. | |

(Continued)

FOREIGN PATENT DOCUMENTS

CN    1630443 A1    6/2005

(Continued)

OTHER PUBLICATIONS

Chen et al., "21.2: Optimum Film Compensation Modes for TN and VA LCDs", SID Digest '98: SID International Symposium Digest of Technical Papers, May 1998, 5 pages.

(Continued)

*Primary Examiner*—James A Dudek
(74) *Attorney, Agent, or Firm*—Fish & Richardson P.C.

(57) ABSTRACT

A display device with a higher contrast ratio is provided. The display device is provided with stacked polarizing plates arranged displaced from a parallel nicol state. Moreover, in the display device, at least one of a pair of stacked polarizing plates is displaced from a parallel state. The pair of stacked polarizing plates is arranged in a cross nicol state. A retardation plate may be provided between the polarizing plate and the substrate. As a result, the contrast ratio can be increased.

18 Claims, 28 Drawing Sheets

U.S. PATENT DOCUMENTS

| | | |
|---|---|---|
| 2004/0263069 A1 | 12/2004 | Yamazaki et al. |
| 2005/0093438 A1 | 5/2005 | Chen |
| 2005/0127820 A1 | 6/2005 | Yamazaki et al. |
| 2005/0157225 A1 | 7/2005 | Toyooka et al. |
| 2005/0157255 A1 | 7/2005 | Masterson |
| 2005/0179835 A1 | 8/2005 | Lee et al. |
| 2006/0007376 A1 | 1/2006 | Fukuda et al. |
| 2006/0055847 A1 | 3/2006 | Yamazaki et al. |
| 2006/0114375 A1 | 6/2006 | Yeh et al. |
| 2006/0114384 A1 | 6/2006 | Yeh et al. |
| 2006/0158096 A1 | 7/2006 | Adachi et al. |

FOREIGN PATENT DOCUMENTS

| | | |
|---|---|---|
| EP | 0 365 778 | 5/1990 |
| JP | 62-206524 | 9/1987 |
| JP | 64-82014 | 3/1989 |
| JP | 05-034731 | 2/1993 |
| JP | 06-222357 | 8/1994 |
| JP | 2761453 | 6/1998 |
| JP | 10-255976 | 9/1998 |
| JP | 2000-180843 | 6/2000 |
| JP | 2000-249832 | 9/2000 |
| JP | 3174367 | 6/2001 |
| JP | 2002-277867 | 9/2002 |
| JP | 2003-279963 | 10/2003 |
| WO | WO 00/34821 | 6/2000 |
| WO | 2004/036272 | 4/2004 |

OTHER PUBLICATIONS

European Office Action (Application No. 06025980.1—2205) mailed May 7, 2007, 10 pages.

Office action (Application No. 200610156260.3) dated Jan. 29, 2010, with Full English translation, 18 pages.

\* cited by examiner

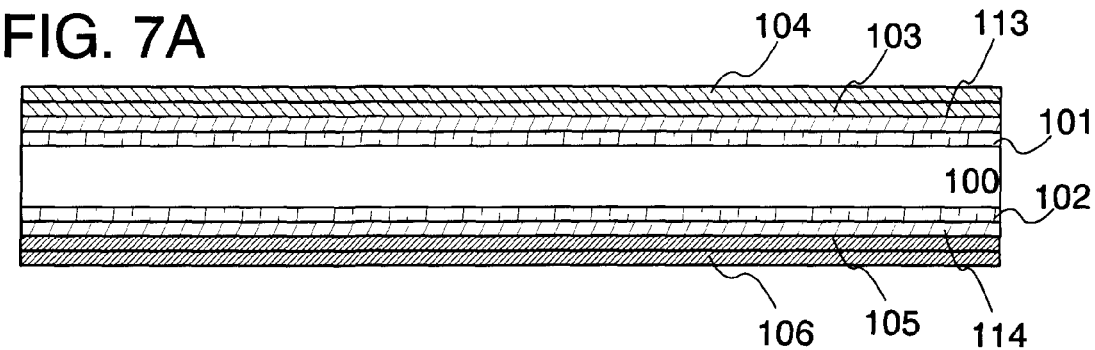
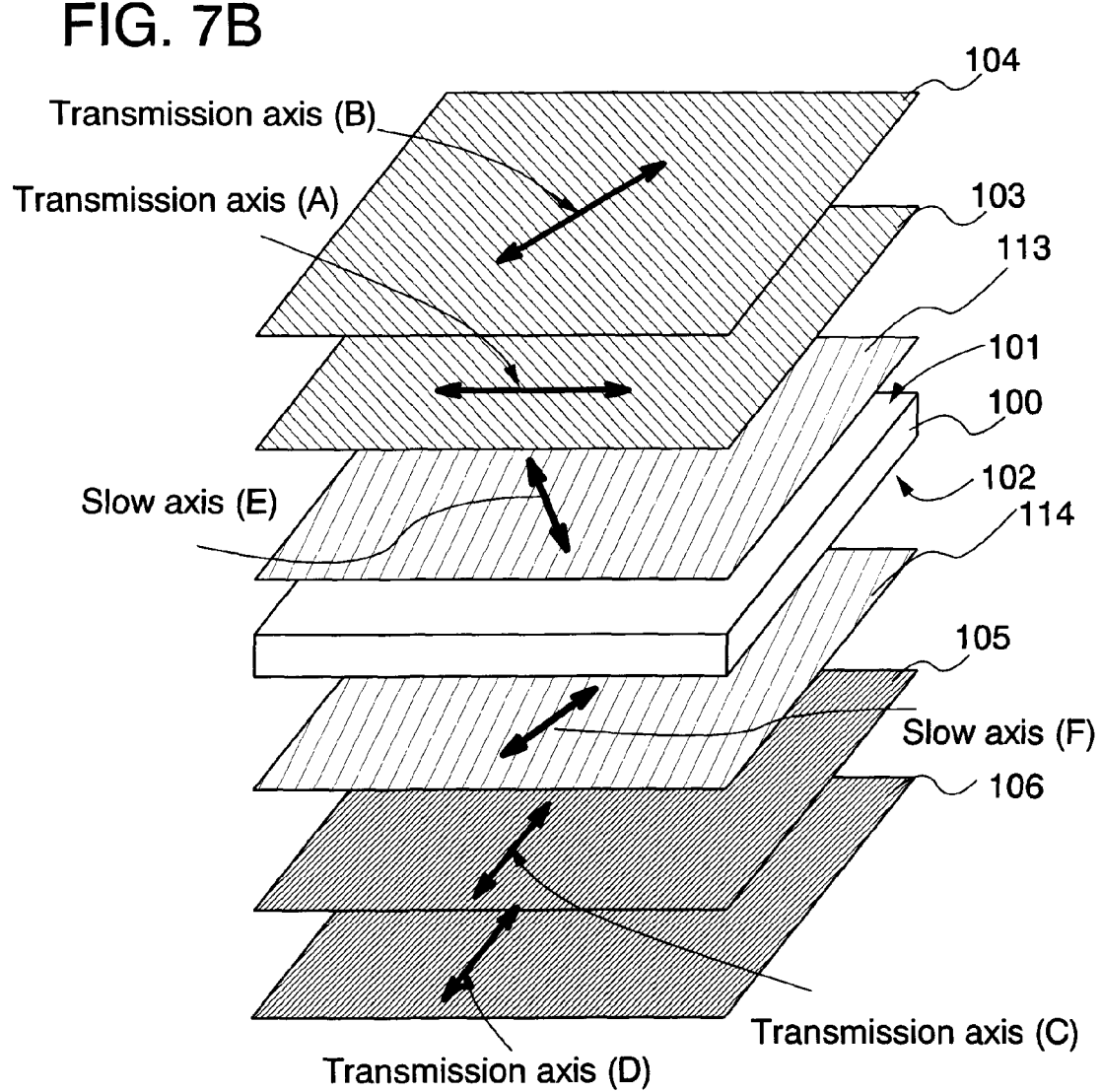

FIG. 13
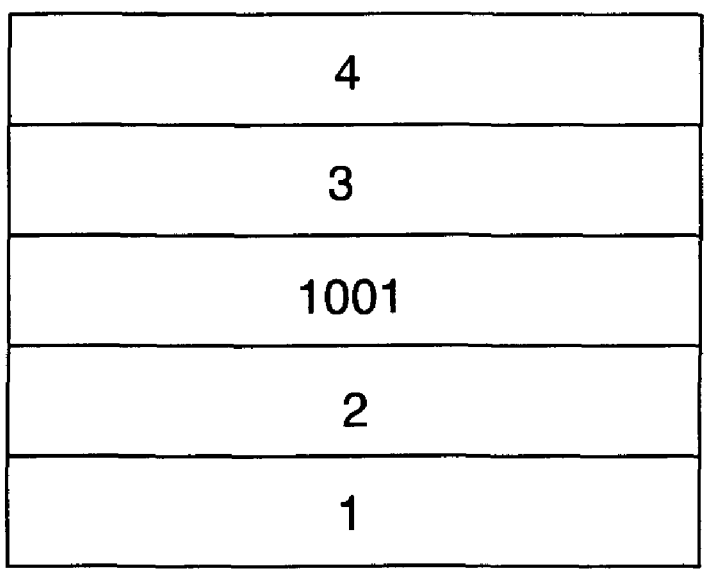
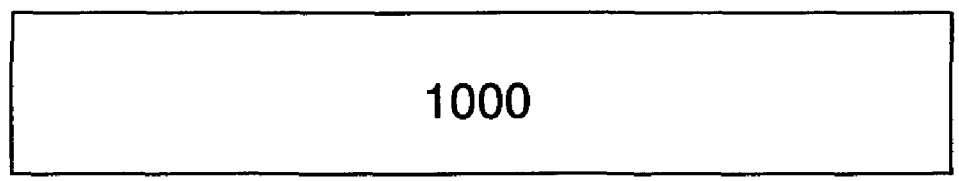

Angle between absorption axis of the polarizing plate 4 and the reference line [deg]

Angle between absorption axis of the polarizing plate 4 and the reference line [deg]

DISPLAY DEVICE

BACKGROUND OF THE INVENTION

1. Field of the Invention

The present invention relates to a structure of a display device for enhancing a contrast ratio.

2. Description of the Related Art

A display device which is very thin and lightweight as compared to a conventional cathode-ray tube display device, a so-called flat panel display, has been developed. A liquid crystal display device having a liquid crystal element as a display element, a light-emitting device having a self-light-emitting element, an FED (field emission display) using an electron beam, and the like compete in the market of flat panel displays. Therefore, lower power consumption and a higher contrast ratio are demanded in order to increase the added value and differentiate from other products.

In general, a liquid crystal display device is provided with one polarizing plate over each of substrates to keep a contrast ratio. When black display is performed more clearly, the contrast ratio can be improved. Therefore, higher display quality can be provided when an image is seen in a dark room such as a home theater room.

For example, it is suggested that a first polarizing plate is provided outside a substrate on a viewing side of a liquid crystal cell, a second polarizing plate is provided outside a substrate facing the substrate on the viewing side, and a third polarizing plate is provided for enhancing the polarization degree when light from an auxiliary light source provided on the substrate side polarizes through the second polarizing plate and passes through the liquid crystal cell, in order to improve a contrast ratio and suppress unevenness of display which is caused due to shortage of the polarization degree and polarization distribution of polarizing plates (see Patent Document 1). [Patent Document 1] PCT International Publication No. 00/34821

SUMMARY OF THE INVENTION

However, a contrast ratio still has been required to be enhanced and researches have been made for enhancement of contrast in a liquid crystal display device. Further, it is a problem that a polarizing plate having a high polarization degree is expensive.

In the present invention made in view of the aforementioned problem, one of light-transmitting substrates arranged so as to face each other is provided with stacked polarizing plates which are arranged displaced from a parallel nicol state.

In addition, in the present invention, both of light-transmitting substrates arranged so as to face each other are provided with stacked polarizing plates. The polarizing plates that face each other are provided in a cross nicol state, and the stacked polarizing plates are arranged displaced from a parallel nicol state. Alternatively, the polarizing plates that face each other may be arranged displaced from a cross nicol state. A waveplate or a retardation plate may be provided between the stacked polarizing plates and the substrate.

An aspect of the present invention is a display device including: a first light-transmitting substrate and a second light-transmitting substrate that face each other; a display element sandwiched between the first light-transmitting substrate and the second light-transmitting substrate; and stacked polarizing plates outside the first light-transmitting substrate or the second light-transmitting substrate. The stacked polarizing plates are arranged with their transmission axes displaced from a parallel nicol state.

Another aspect of the present invention is a display device including: a first light-transmitting substrate and a second light-transmitting substrate that face each other; a display element sandwiched between the first light-transmitting substrate and the second light-transmitting substrate; first stacked polarizing plates outside the first light-transmitting substrate; and second stacked polarizing plates outside the second light-transmitting substrate. The first stacked polarizing plates are arranged with their transmission axes displaced from a parallel nicol state, and the second stacked polarizing plates are arranged with their transmission axes being in a parallel nicol state.

Another aspect of the present invention is a display device including: a first light-transmitting substrate and a second light-transmitting substrate that face each other; a display element sandwiched between the first light-transmitting substrate and the second light-transmitting substrate; first stacked polarizing plates outside the first light-transmitting substrate; and second stacked polarizing plates outside the second light-transmitting substrate. The first stacked polarizing plates are arranged with their transmission axes being in a parallel nicol state, and the second stacked polarizing plates are arranged with their transmission axes displaced from a parallel nicol state.

In the present invention, the first stacked polarizing plates have the transmission axes to be in a cross nicol state with respect to the transmission axes of the second stacked polarizing plates.

In the present invention, the stacked polarizing plates displaced from a parallel nicol state are arranged on a viewing side.

By the simple structure in which plural polarizing plates are stacked displaced, the display device can have a higher contrast ratio.

BRIEF DESCRIPTION OF DRAWINGS

In the accompanying drawings:

FIGS. 7A and 7B show a display device of the present invention;

FIG. 13 shows an experiment condition of the present invention;

DETAILED DESCRIPTION OF THE INVENTION

Figure 1A:
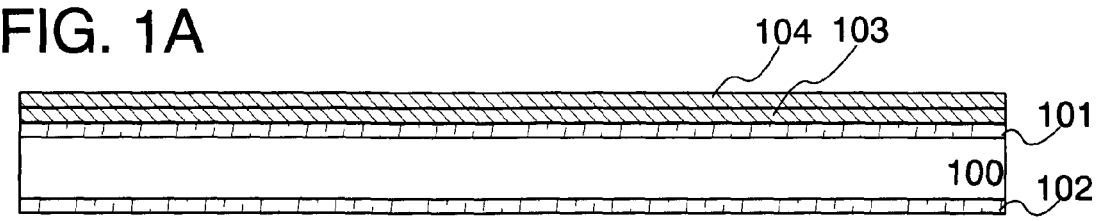
FIGS. 1A and 1B show a display device of the present invention.

Embodiment Modes and Embodiments of the present invention will be hereinafter described with reference to drawings. However, the present invention can be embodied in many different modes and it is easily understood by those skilled in the art that the mode and detail can be variously changed without departing from the scope and spirit of the present invention. Therefore, the present invention is not construed as being limited to the description of the embodiment modes and embodiments. It is to be noted that the same portions or portions having a similar function are denoted by the same reference numeral and the description of such portions is not repeated.

Embodiment Mode 1

Embodiment Mode 1 will explain a concept of a display device of the present invention.

Figure 1B:
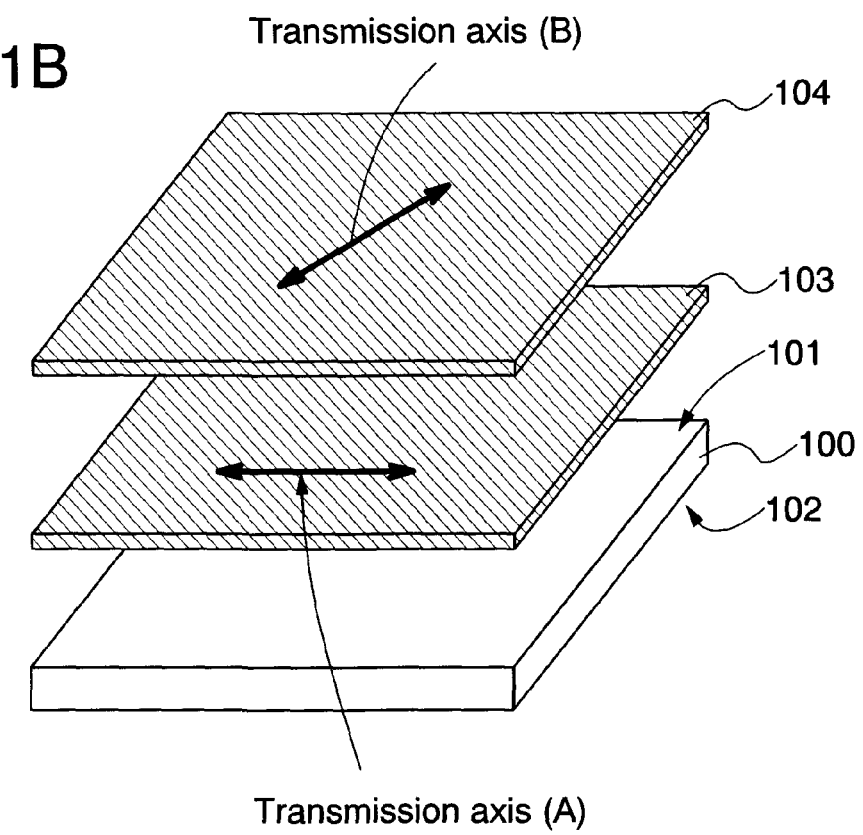

FIG. 1A is a cross-sectional view of a display device having a structure in which stacked polarizing plates are arranged displaced from a parallel nicol state. FIG. 1B is a perspective view of the display device. This embodiment mode explains an example of a liquid crystal display device having a liquid crystal element as a display element.

As shown in FIG. 1A, a layer 100 having a liquid crystal element is sandwiched between a first substrate 101 and a second substrate 102 which are arranged so as to face each other. Each of the substrates is an insulating substrate having a light-transmitting property (hereinafter also referred to as a light-transmitting substrate). As the substrates, for example, a glass substrate made of barium borosilicate glass, aluminoborosilicate glass, or the like; a quartz substrate; or the like can be used. Further, a substrate formed of plastic typified by polyethylene terephthalate (PET), polyethylene naphthalate (PEN), and polyether sulfone (PES), or a synthetic resin having flexibility such as acrylic can be used as the substrates.

Stacked polarizing plates are provided outside the substrate, i.e., on a side not in contact with the layer having a liquid crystal element. A first polarizing plate 103 and a second polarizing plate 104 are provided on the first substrate 101 side in such a way that the first polarizing plate 103 and the second polarizing plate 104 are displaced from a parallel nicol state.

These polarizing plates can be formed of a known material. For example, a structure where an adhesive layer, TAC (triacetylcellulose), a mixed layer of PVA (polyvinyl alcohol) and iodine, and TAC are sequentially stacked from the substrate side can be used. The polarization degree can be controlled by the mixed layer of PVA (polyvinyl alcohol) and iodine. Moreover, there is a polarizing plate including an inorganic material. Further, a polarizing plate may also be referred to as a polarizing film due to its shape.

As shown in FIG. 1B, the first polarizing plate 103 and the second polarizing plate 104 are stacked in such a way that a transmission axis (A) of the first polarizing plate 103 and a transmission axis (B) of the second polarizing plate 104 are displaced from each other. By stacking the polarizing plates with their transmission axes displaced in this manner, the contrast ratio can be improved.

Figure 2:
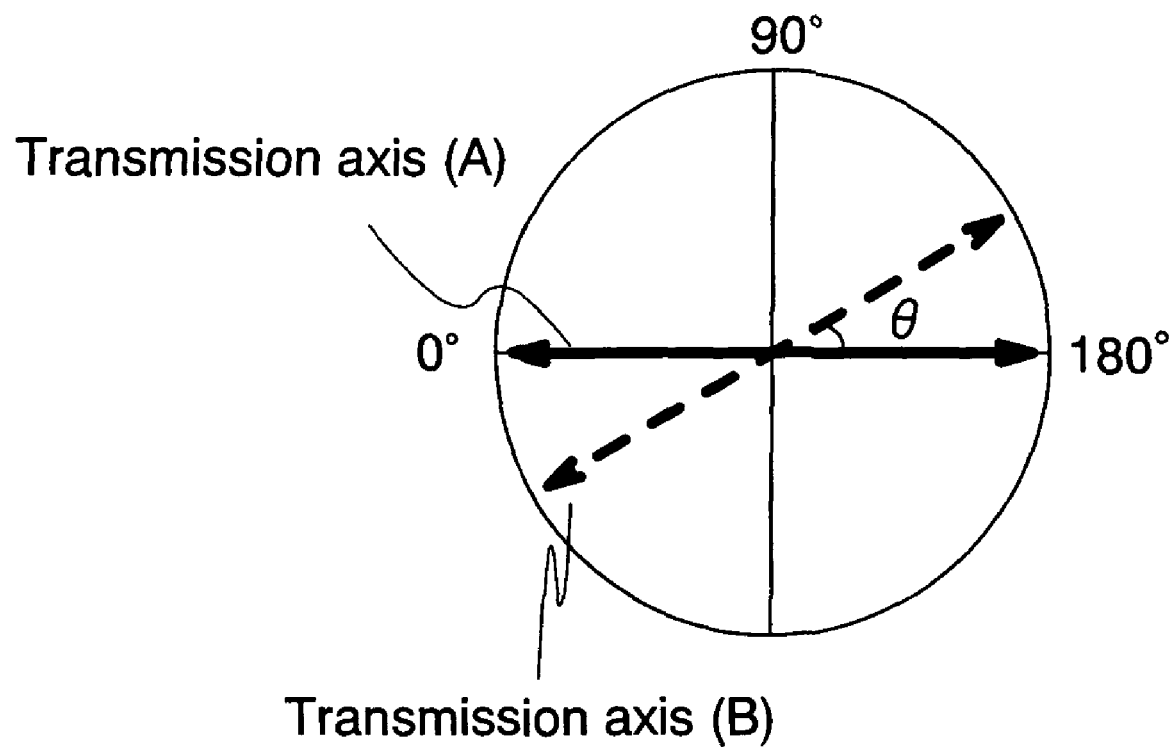
FIG. 2 shows an angle between polarizing plates of the present invention.

FIG. 2 is a top view showing an angle between the transmission axis (A) of the first polarizing plate 103 and the transmission axis (B) of the second polarizing plate 104. The first polarizing plate 103 and the second polarizing plate 104 are stacked in such a way that the transmission axis (A) and the transmission axis (B) are displaced by an angle θ. The second polarizing plate 104 provided thus on the outer side is stacked while being displaced.

The structure in which the stacked polarizing plates are provided over one side of the substrate as described in this embodiment mode can be applied to a display device in which light can be extracted from one side of the substrate.

It is to be noted that, as one feature, a polarizing plate has an absorption axis in a direction perpendicular to a transmission axis. Therefore, a state in which the absorption axes are parallel to each other can also be referred to as a parallel nicol state.

By arranging such stacked polarizing plates so as to displace from a parallel nicol state, light leakage in directions of the transmission axes can be reduced. Thus, the contrast ratio of the display device can be enhanced.

Embodiment Mode 2

Embodiment Mode 2 will describe a concept of a display device provided with a retardation plate in addition to stacked polarizing plates, differently from the above embodiment mode.

Figure 3A:
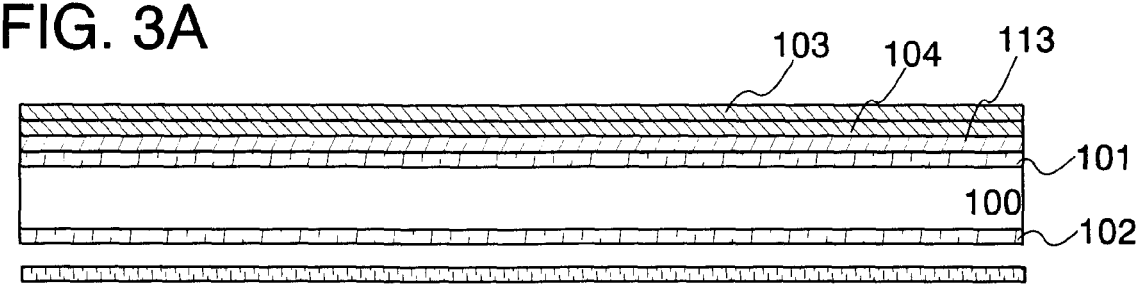
FIGS. 3A and 3B show a display device of the present invention.
Figure 3B:
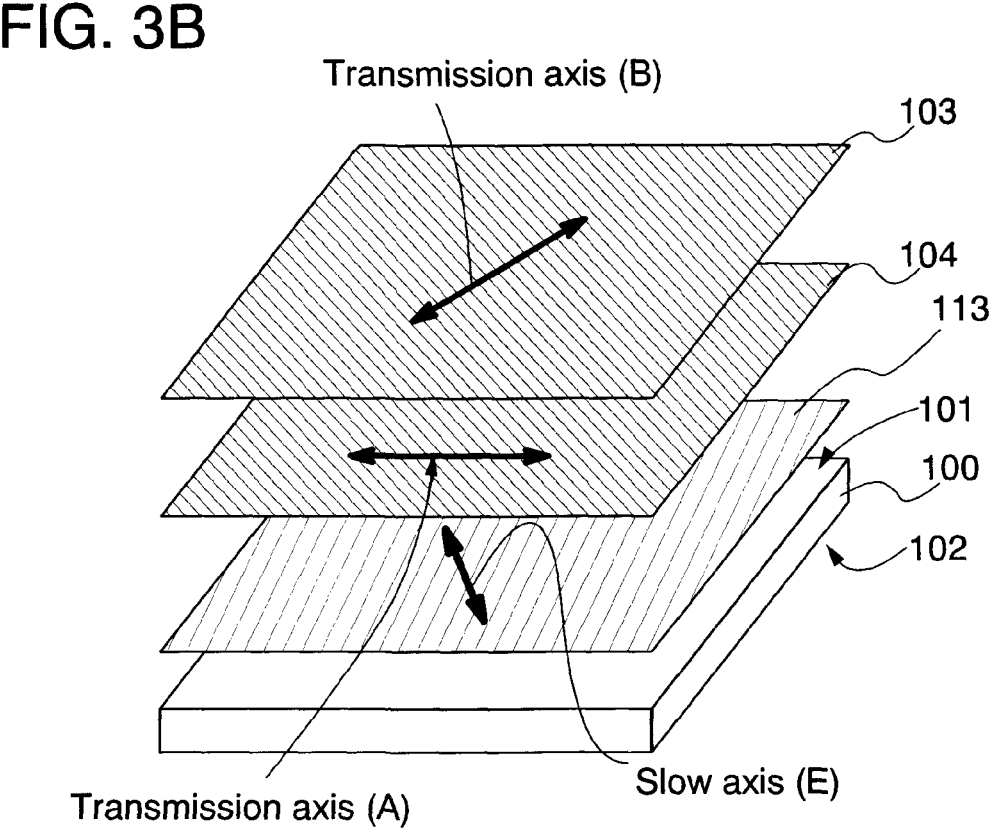

FIG. 3A is a cross-sectional view of a display device in which a retardation plate is provided between a substrate and polarizing plates that are stacked displaced from a parallel nicol state. FIG. 3B is a perspective view of the display device. This embodiment mode will explain an example of a liquid crystal display device having a liquid crystal element as a display element.

As shown in FIG. 3A, the first polarizing plate 103 and the second polarizing plate 104 are provided on the first substrate 101 side. At this time, the first polarizing plate 103 and the second polarizing plate 104 are arranged displaced from a parallel nicol state. Moreover, a retardation plate 113 is provided between the first substrate 101 and the stacked polarizing plates.

The retardation plate may be, for example, a film in which liquid crystals are hybrid-oriented, a film in which liquid crystals are twisted-oriented, a uniaxial retardation plate, or a biaxial retardation plate. Such retardation plates can widen the viewing angle of the display device.

A uniaxial retardation plate is formed by stretching a resin in one direction. Further, a biaxial retardation plate is formed by stretching a resin into an axis in a crosswise direction, and then gently stretching the resin into an axis in a lengthwise direction. As the resin used here, cyclo-olefin polymer (COE), polycarbonate (PC), polymethyl methacrylate (PMMA), polystyrene (PS), polyether sulfone (PES), polyphenylene sulfide (PPS), polyethylene terephthalate (PET), polyethylene naphthalate (PEN), polypropylene (PP), polyphenylene oxide (PPO), polyarylate (PAR), polyimide (PI), polytetrafluoroethylene (PTFE), or the like is given.

Note that the film in which liquid crystals are hybrid-oriented is formed by using a triacetyl cellulose (TAC) film as a base and hybrid-aligning discotic liquid crystals or nematic liquid crystals. The retardation plate can be attached to a light-transmitting substrate after being attached to a polarizing plate.

In this embodiment mode, a reflective plate may be added. The reflective plate can be provided outside the second substrate 102 or can be obtained by forming a pixel electrode with a highly reflective material.

As shown in FIG. 3B, the first polarizing plate 103 and the second polarizing plate 104 are stacked in such a way that the transmission axis (A) of the first polarizing plate 103 and the transmission axis (B) of the second polarizing plate 104 are displaced from each other. More specifically, the transmission axis (A) of the first polarizing plate 103 and a slow axis (E) of the retardation plate 113 are displaced by 45° from each other. By providing the retardation plate in this manner, black display can be performed and the viewing angle can be made wider. An angle of 45° is just an example, and other predetermined angles may be set as long as the viewing angle can be wider. In this manner, when the polarizing plates are stacked with their transmission axes displaced from each other and the retardation plate is provided, the contrast ratio can be improved.

Figure 4:
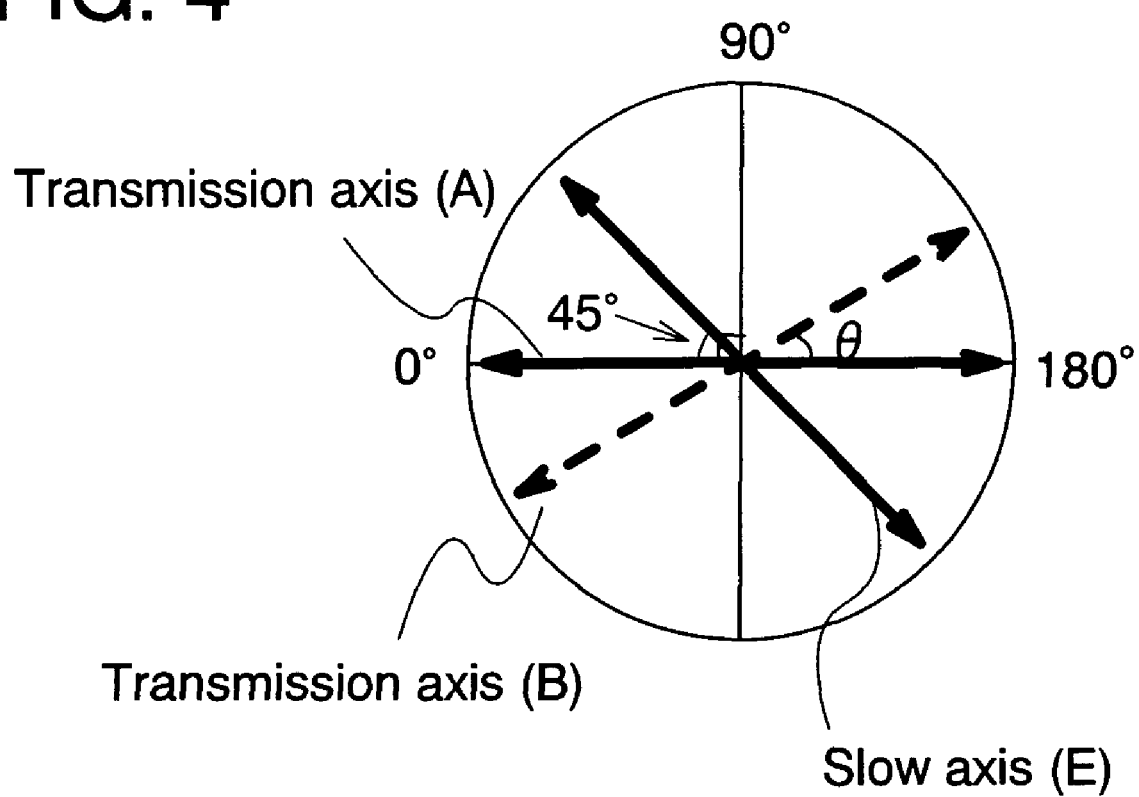
FIG. 4 shows an angle between polarizing plates of the present invention.

FIG. 4 is a top view showing angles among the transmission axis (A) of the first polarizing plate 103, the transmission axis (B) of the second polarizing plate 104, and the slow axis (E) of the retardation plate 113. The first polarizing plate 103 and the second polarizing plate 104 are stacked in such a way that the transmission axis (A) and the transmission axis (B) are displaced by an angle θ. In addition, the first polarizing plate 103 and the retardation plate 113 are arranged in such a way that the transmission axis (A) and the slow axis (E) have an angle of 45° therebetween.

The structure having the stacked polarizing plates over one side of the substrate as described in this embodiment mode can be applied to a display device in which light can be extracted from one side of the substrate.

It is to be noted that, as one feature, a retardation plate has a fast axis in a direction perpendicular to a slow axis. Therefore, the arrangement can be decided based on the fast axis instead of the slow axis.

In this manner, when the polarizing plates are stacked so as to displace from a parallel nicol state and the retardation plate is further provided, light leakage in directions of the transmission axes can be reduced. Accordingly, the contrast ratio of the display device can be improved.

Embodiment Mode 3

Differently from the above embodiment mode, Embodiment Mode 3 will describe a concept of a display device provided with a pair of stacked polarizing plates.

Figure 5A:
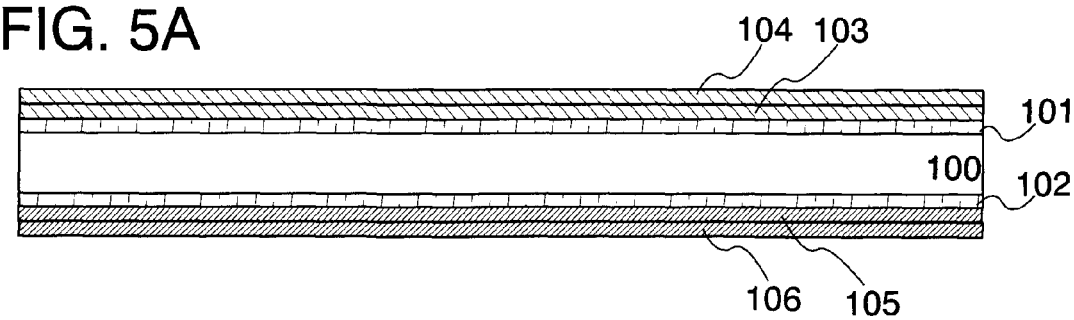
FIGS. 5A and 5B show a display device of the present invention.
Figure 5B:
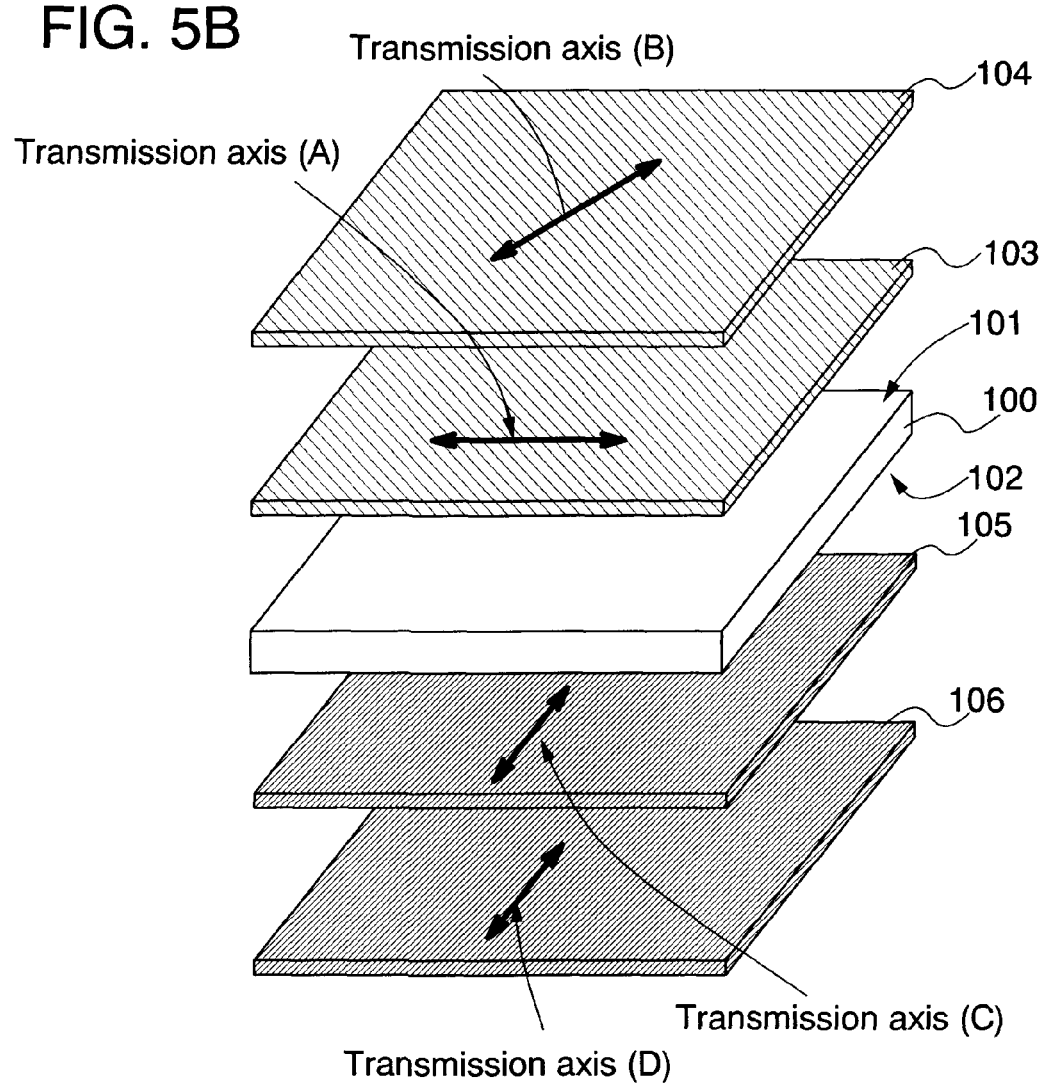

FIG. 5A is a cross-sectional view showing a display device with a structure in which a pair of stacked polarizing plates is provided and at least one of the pair of stacked polarizing plates is arranged displaced from a parallel nicol state. FIG. 5B is a perspective view of the display device. This embodiment mode will explain an example of a liquid crystal display device having a liquid crystal element as a display element.

In this embodiment mode, stacked polarizing plates are provided outside the substrate, i.e., on a side not in contact with a layer having a liquid crystal element. Specifically, as shown in FIG, 5A, the first polarizing plate 103 and the second polarizing plate 104 are provided in order on the first substrate 101 side. A third polarizing plate 105 and a fourth polarizing plate 106 are provided in order on the second substrate 102 side. In this embodiment mode, at least one of the pair of stacked polarizing plates is displaced from a parallel nicol state. In specific, as shown in FIG. 5B, the first polarizing plate 103 and the second polarizing plate 104 are stacked in such a way that the transmission axis (A) and the transmission axis (B) are displaced from a parallel state. Then, the third polarizing plate 105 and the fourth polarizing plate 106 are stacked in such a way that a transmission axis (C) of the third polarizing plate 105 and a transmission axis (D) of the fourth polarizing plate 106 are in a parallel state, i.e., a parallel nicol state.

Then, the first polarizing plate 103 and the third polarizing plate 105 are arranged so as to be in a cross nicol state. That is to say, the third and fourth polarizing plates that are stacked and the first polarizing plate are arranged so as to be in a cross nicol state, and the second polarizing plate is arranged displaced from the first polarizing plate. The polarizing plate to be displaced is preferably the polarizing plate that is arranged on an outer side among the stacked polarizing plates.

It is to be noted that the first polarizing plate 103 and the third polarizing plate 105 may be displaced from a cross nicol state within the range of obtaining predetermined black display.

The transmission axis (B) of the second polarizing plate 104 is displaced so as to correspond to a minor-axis direction of an ellipse of elliptically-polarized light emitted from the first polarizing plate 103. That is to say, an absorption axis of the second polarizing plate 104 is displaced so as to correspond to a major-axis direction of an ellipse of elliptically-polarized light emitted from the first polarizing plate 103.

Although not shown in FIGS. 5A and 5B, an irradiation means such as a backlight is provided under the fourth polarizing plate 106. That is, the polarizing plate to be displaced is preferably the polarizing plate that is arranged on an outer side among the stacked polarizing plates on a viewing side to which the irradiation means is not provided.

Figure 6:
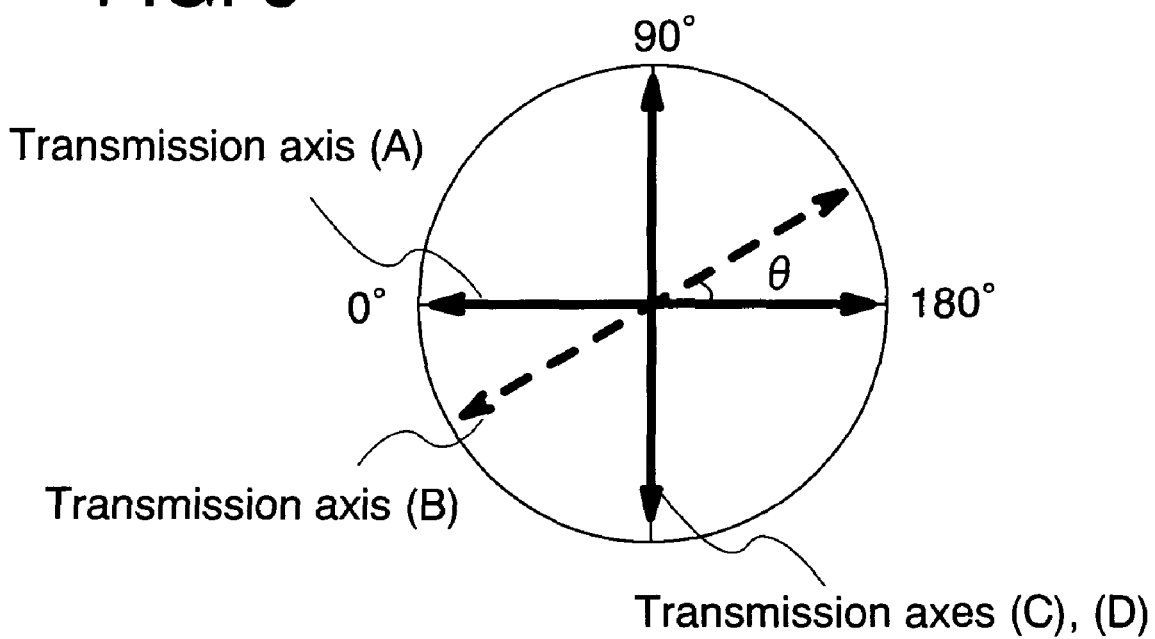
FIG. 6 shows an angle between polarizing plates of the present invention.

FIG. 6 is a top view showing angles among the transmission axis (A) of the first polarizing plate 103, the transmission axis (B) of the second polarizing plate 104, the transmission axis (C) of the third polarizing plate 105, and the transmission axis (D) of the fourth polarizing plate 106. The first polarizing plate 103 and the second polarizing plate 104 are stacked in such a way that the transmission axis (A) and the transmission axis (B) are displaced by an angle θ. In this embodiment mode, the third polarizing plate 105 and the fourth polarizing plate 106 are arranged in such a way that the transmission axis (C) and the transmission axis (D) are in a parallel nicol state.

As shown in this embodiment mode, the pair of stacked polarizing plates can be applied to a display device in which light can be extracted from a side opposite to the substrate provided with the backlight. In addition, the pair of stacked polarizing plates may be applied to a display device in which, by using a light-transmitting backlight, light can be extracted also from the substrate provided with the backlight, i.e., a display device in which light can be extracted from both sides.

In this manner, when at least one of the pair of stacked polarizing plates, preferably stacked polarizing plates on the viewing side, is provided so that the transmission axes are displaced from a parallel nicol state, light leakage in directions of the transmission axes can be reduced. Therefore, the contrast ratio of the display device can be improved.

Embodiment Mode 4

This embodiment mode will explain a mode of stacked polarizing plates that are displaced differently from the above embodiment mode.

Although the above embodiment mode shows that the first polarizing plate 103 and the third polarizing plate 105 are arranged so as to be in a cross nicol state, the present invention is not limited to this. For example, the third polarizing plate 105 and the first and second polarizing plates 103 and 104 may be arranged displaced from a cross nicol state, and the first polarizing plate 103 and the second polarizing plate 104 may be arranged so as to be in a parallel nicol state.

In this case, the transmission axis (A) of the first polarizing plate 103 is displaced in a minor-axis direction of an ellipse of elliptically-polarized light emitted from a liquid crystal element. Concerning an absorption axis, it can be said that an absorption axis of the first polarizing plate 103 is displaced in a major-axis direction of an ellipse of elliptically-polarized light emitted from a liquid crystal element.

The contrast ratio can be improved also by displacing the pair of stacked polarizing plates from a cross nicol state.

Embodiment Mode 5

This embodiment mode will explain a concept of a display device provided with a retardation plate in addition to a pair of stacked polarizing plates, differently from the above embodiment mode.

FIG. 7A is a cross-sectional view of a display device in which one of a pair of stacked polarizing plates is displaced from a parallel nicol state, and each retardation plate is provided between a substrate and one of the pair of polarizing plates. This embodiment mode explains an example of a liquid crystal display device having a liquid crystal element as a display element.

As shown in FIG. 7A, the first polarizing plate 103 and the second polarizing plate 104 are provided on the first substrate 101 side. The third polarizing plate 105 and the fourth polarizing plate 106 are provided on the second substrate 102 side.

As shown in FIG. 7B, the first polarizing plate 103 and the second polarizing plate 104 are arranged displaced from a parallel nicol state. The retardation plate 113 is provided between the first substrate 101 and the stacked polarizing plates.

Moreover, as shown in FIG. 7B, the third polarizing plate 105 and the fourth polarizing plate 106 are provided on the second substrate 102 side. The third polarizing plate 105 and the fourth polarizing plate 106 are arranged so as to be in a parallel nicol state. In addition, a retardation plate 114 is provided between the second substrate 102 and the stacked polarizing plates.

Although not shown in FIGS. 7A and 7B, an irradiation means such as a backlight is provided under the fourth polarizing plate 106.

In this embodiment mode, the first polarizing plate 103 and the third polarizing plate 105 are arranged so as to be in a cross nicol state. The first polarizing plate 103 and the third polarizing plate 105 may be displaced from a cross nicol state within the range of obtaining predetermined black display.

Figure 8:
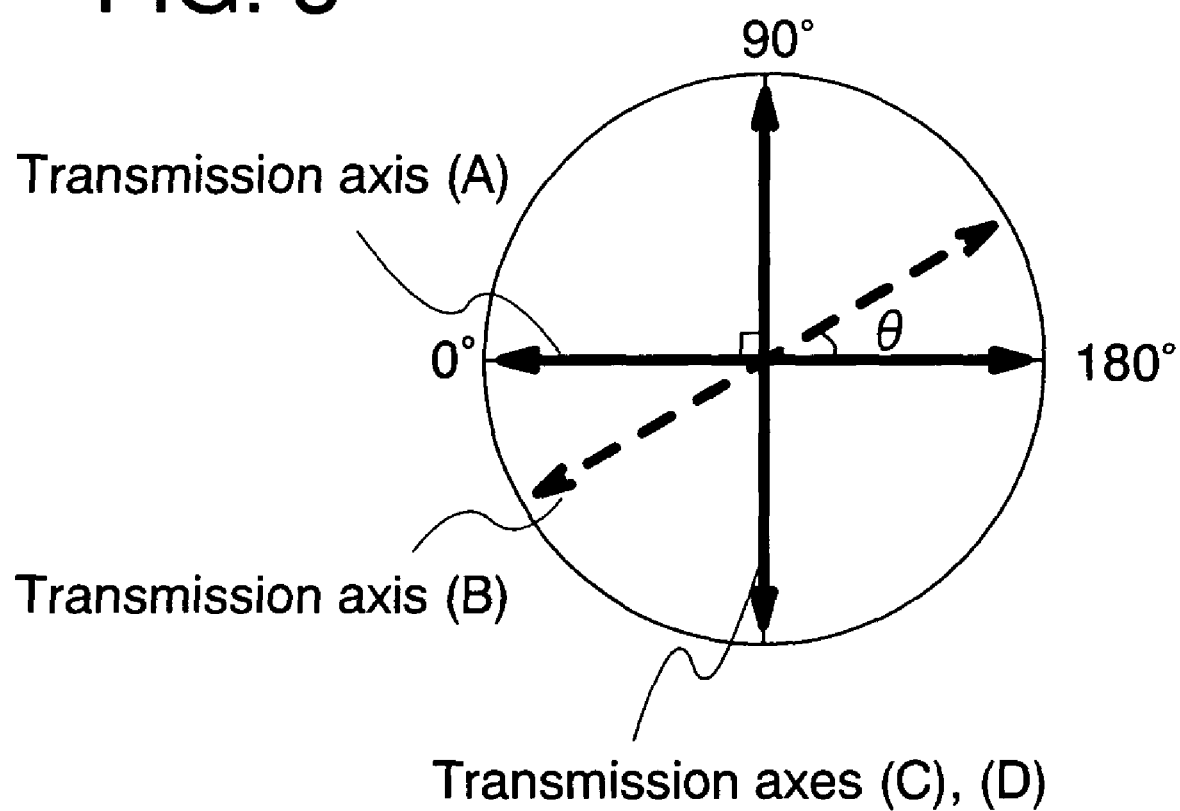
FIG. 8 shows an angle between polarizing plates of the present invention.

FIG. 8 is a top view showing angles among the transmission axis (A) of the first polarizing plate 103, the transmission axis (B) of the second polarizing plate 104, the transmission axis (C) of the third polarizing plate 105, and the transmission axis (D) of the fourth polarizing plate 106. The first polarizing plate 103 and the second polarizing plate 104 are stacked in such a way that the transmission axis (A) and the transmission axis (B) are displaced by an angle θ. The transmission axis (B) of the second polarizing plate 104 is displaced so as to correspond to a minor-axis direction of an ellipse of elliptically-polarized light emitted from the transmission axis (A) of the first polarizing plate 103. This displacement angle corresponds to 74. In this embodiment mode, the third polarizing plate 105 and the fourth polarizing plate 106 are arranged in such a way that the transmission axis (C) and the transmission axis (D) are in a parallel nicol state. The first polarizing plate 103 and the third polarizing plate 105 are arranged in such a way that the transmission axis (A) and the transmission axis (C) are in a cross nicol state.

As shown in this embodiment mode, the pair of stacked polarizing plates can be applied to the display device in which light can be extracted from both sides of the substrate.

In the structure having the pair of stacked polarizing plates and the retardation plates in this manner, light leakage in directions of the transmission axes can be reduced by stacking the polarizing plates so as to displace from a parallel nicol state on at least one side, preferably on a viewing side. Accordingly, the contrast ratio of the display device can be improved.

Embodiment Mode 6

Embodiment Mode 6 will describe a mode having a retardation plate and polarizing plates which are stacked displaced differently from the above embodiment mode.

Although the above embodiment mode shows the mode in which the retardation plate is provided and the first polarizing plate 103 and the third polarizing plate 105 are arranged so as to be in a cross nicol state, the present invention is not limited to this. For example, the structure may be that the retardation plate is provided, the third polarizing plate 105 and the first and second polarizing plates 103 and 104 are arranged displaced from a cross nicol state, and the first polarizing plate 103 and the second polarizing plate 104 are arranged in a parallel nicol state.

In this case, the transmission axis (A) of the first polarizing plate 103 is displaced in a minor-axis direction of an ellipse of elliptically-polarized light emitted from a liquid crystal element. Concerning an absorption axis, it can be said that the absorption axis of the first polarizing plate 103 is displaced in a major-axis direction of an ellipse of elliptically-polarized light emitted from the liquid crystal element.

The contrast ratio can also be improved by having the retardation plate and displacing the pair of stacked polarizing plates from a cross nicol state.

Embodiment Mode 7

Embodiment Mode 7 will describe a structure of a liquid crystal display device having a structure in which a pair of stacked polarizing plates is provided and transmission axes of at least one of the pair of stacked polarizing plates are displaced from each other.

Figure 9:
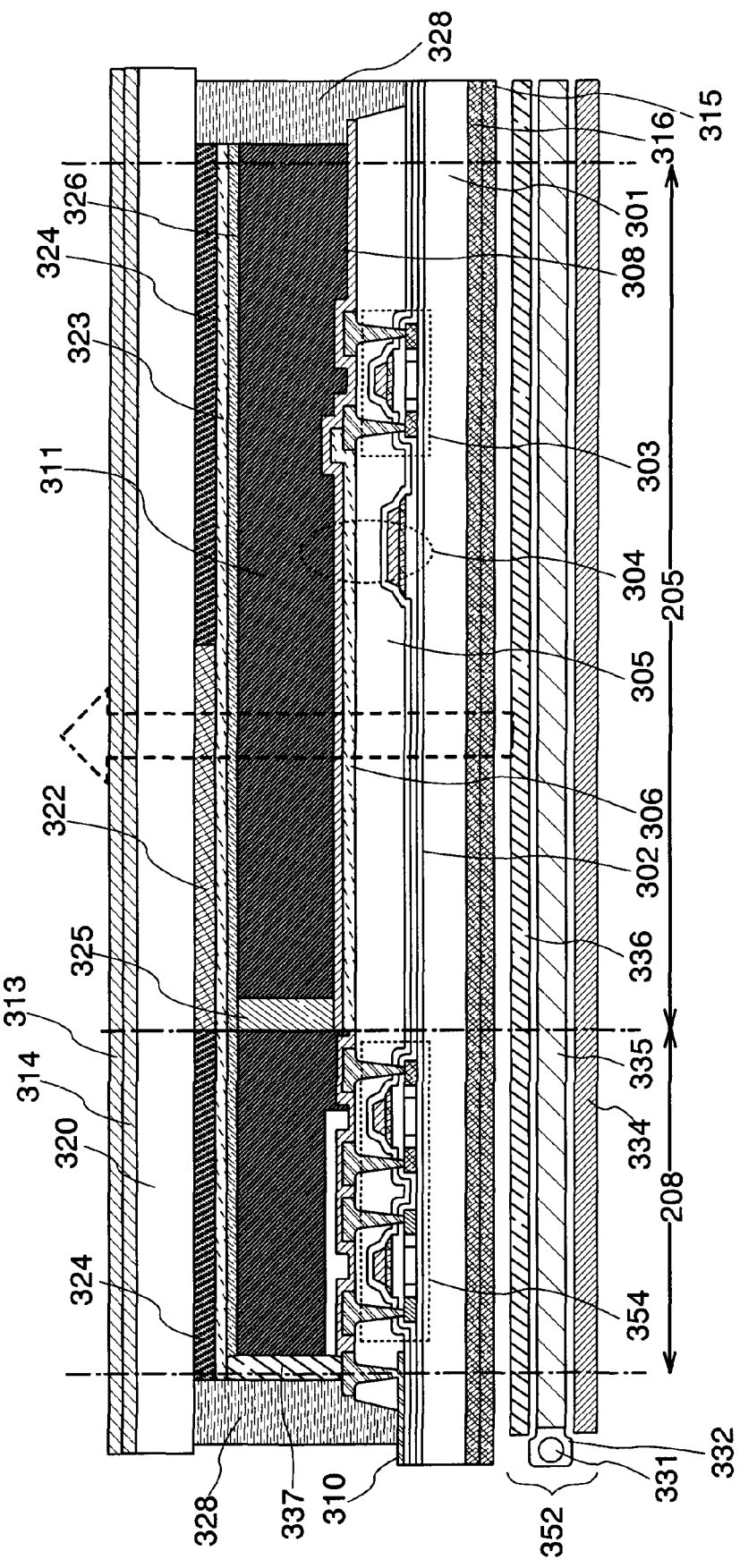
FIG. 9 is a cross-sectional view showing a display device of the present invention.

FIG. 9 is a cross-sectional view of a liquid crystal display device having stacked polarizing plates.

The liquid crystal display device includes a pixel portion 205 and a driving circuit portion 208. In the pixel portion 205 and the driving circuit portion 208, a base film 302 is provided over a substrate 301. An insulating substrate similar to any of those in the aforementioned embodiment mode can be used as the substrate 301. It is concerned that a substrate formed of a synthetic resin generally has lower heat resistance than other substrates; however, it can be employed by transferring an element to a substrate formed of a synthetic resin after manufacturing the element using a substrate with higher heat resistance.

The pixel portion 205 is provided with a transistor as a switching element with the base film 302 interposed therebetween. In this embodiment mode, a thin film transistor (TFT) is used as the transistor, which is referred to as a switching TFT 303. A TFT can be formed by many methods. For example, a crystalline semiconductor film is used as an active layer. A gate electrode is provided over the crystalline semiconductor film with a gate insulating film interposed therebetween. An impurity element can be added to the active layer by using the gate electrode. When an impurity element is added using the gate electrode in this manner, a mask for adding the impurity element is not necessary. The gate electrode may have a single-layer structure or a stacked-layer structure. An impurity region can be formed as a high-concentration impurity region or a low-concentration impurity region by controlling the concentration thereof. A structure of a TFT thus having a low-concentration impurity region is referred to as an LDD (Lightly-Doped Drain) structure. The low-concentration impurity region can be formed so as to overlap with the gate electrode. A structure of such a TFT is referred to as a GOLD (Gate Overlapped LDD) structure. FIG. 9 shows the switching TFT 303 having a GOLD structure. The polarity of the switching TFT 303 is an n-type by using phosphorus (P) or the like for an impurity region thereof. In the case of forming a p-type TFT, boron (B) or the like may be added. After that, a protective film covering a gate electrode and the like is formed. A dangling bond in the crystalline semiconductor film can be terminated by hydrogen elements mixed in the protective film. Further, in order to enhance the flatness, an interlayer insulating film 305 may be formed. The interlayer insulating film 305 may be formed of an organic material or an inorganic material, or formed using a stacked-layer structure of these. Openings are formed in the interlayer insulating film 305, the protective film, and the gate insulating film; thereby wirings connected to the impurity regions are formed. In this manner, the switching TFT 303 can be formed. It is to be noted that the present invention is not limited to the structure of the switching TFT 303.

Then, a pixel electrode 306 connected to the wiring is formed.

Further, a capacitor 304 can be formed at the same time as the switching TFT 303. In this embodiment mode, the capacitor 304 is formed of a stack of a conductive film formed at the same time as the gate electrode, the protective film, the interlayer insulating film 305, and the pixel electrode 306.

Further, a pixel portion and a driving circuit portion can be formed over one substrate by using a crystalline semiconductor film. In that case, transistors in the pixel portion and transistors in the driving circuit portion 208 are formed at the same time. The transistors used for the driving circuit portion 208 form a CMOS circuit; therefore, the transistors are referred to as a CMOS circuit 354. Each of the TFTs that form the CMOS circuit 354 may have a similar structure to the switching TFT 303. Further, the LDD structure can be used instead of the GOLD structure, and a similar structure is not necessarily required.

An alignment film 308 is formed so as to cover the pixel electrode 306. The alignment film 308 is subjected to rubbing treatment. This rubbing treatment is not performed in some cases in a specific mode of a liquid crystal, for example, in a case of a VA mode.

Next, a counter substrate 320 is provided. A color filter 322 and a black matrix (BM) 324 can be provided inside the counter substrate 320, that is, on the side which is in contact with a liquid crystal. These can be formed by known methods; however, a droplet discharging method (representatively an ink-jetting method) by which a predetermined material is dropped can eliminate the waste of the material. Further, the color filter 322 and the like are provided in a region where the switching TFT 303 is not provided. That is to say, the color filter 322 is provided so as to face a light-transmitting region, i.e., an opening region. It is to be noted that the color filter and the like may be formed of materials which exhibit red (R), green (G), and blue (B) in the case where a liquid crystal display device performs full-color display, and a material which exhibits at least one color in the case of mono-color display.

It is to be noted that the color filter is not provided in some cases when diodes (LEDs) of RGB and the like are arranged in a backlight and a successive additive color mixing method (field sequential method) in which color display is performed by time division. The black matrix 324 is provided to reduce reflection of external light due to the wiring of the switching TFT 303 and the CMOS circuit 354. Therefore, the black matrix 324 is provided so as to overlap with the switching TFT 303 and the CMOS circuit 354. Note that the black matrix 324 may be provided so as to overlap with the capacitor 304. Accordingly, reflection by a metal film included in the capacitor 304 can be prevented.

Then, the counter electrode 323 and an alignment film 326 are provided. The alignment film 308 and the alignment film 326 are subjected to rubbing treatment. This rubbing treatment is not performed in some cases in a specific mode of a liquid crystal, for example, in a case of a VA mode.

It is to be noted that the wiring included in the TFT, the gate electrode, the pixel electrode 306, and the counter electrode 323 can be selected from indium tin oxide (ITO), indium zinc oxide (IZO) in which zinc oxide (ZnO) is mixed in indium oxide, a conductive material in which silicon oxide ($SiO_2$) is mixed in indium oxide, organic indium, organotin, a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), or copper (Cu), an alloy thereof, and metal nitride thereof.

Such a counter substrate 320 is attached to the substrate 301 by using a sealing material 328. The sealing material 328 can be drawn over the substrate 301 or the counter substrate 320 by using a dispenser or the like. Further, a spacer 325 is provided in a part of the pixel portion 205 and the driving circuit portion 208 in order to hold a space between the substrate 301 and the counter substrate 320. The spacer 325 has a columnar shape, a spherical shape, or the like.

A liquid crystal 311 is injected between the substrate 301 and the counter substrate 320 attached to each other in this manner. It is preferable to inject the liquid crystal in vacuum. The liquid crystal 311 can be formed by a method other than an injecting method. For example, the liquid crystal 311 may be dropped and then the counter substrate 320 may be attached. Such a dropping method is preferably employed when using a large substrate to which the injecting method cannot be applied easily.

The liquid crystal 311 includes a liquid crystal molecule of which tilt is controlled by the pixel electrode 306 and the counter electrode 323. Specifically, the tilt of the liquid crystal molecule is controlled by a voltage applied to the pixel electrode 306 and the counter electrode 323. Such a control is performed using a control circuit provided in the driving circuit portion 208. It is to be noted that the control circuit is not necessarily formed over the substrate 301 and a circuit connected through a connecting terminal 310 may be used. In this case, an anisotropic conductive film containing conductive microparticles can be used so as to be connected to the connecting terminal 310. Further, the counter electrode 323 is electrically connected to a part of the connecting terminal 310, whereby a potential of the counter electrode 323 can be common. For example, a bump 337 can be used for the conduction.

Next, description is made of a structure of a backlight unit 352. The backlight unit 352 includes a cold cathode tube, a hot cathode tube, a diode, an inorganic EL element, or an organic EL element as a light source 331 which emits fluorescence, a lamp reflector 332 to effectively lead fluorescence to a light guide plate 335, the light guide plate 335 by which fluorescence is totally reflected and led to the entire surface, a diffusing plate 336 for reducing variation in brightness, and a reflective plate 334 for reusing light leaking under the light guide plate 335.

A control circuit for controlling the luminance of the light source 331 is connected to the backlight unit 352. The luminance of the light source 331 can be controlled by a signal supplied from the control circuit.

Further, polarizing plates 315 and 316 that are stacked are provided between the substrate 301 and the backlight unit 352 and polarizing plates 313 and 314 that are stacked are provided over the counter substrate 320 as well. The polarizing plate 315 and the polarizing plate 316 provided on the backlight side are arranged so as to be in a parallel nicol state, and the polarizing plate 313 and the polarizing plate 314 provided on a viewing side are arranged displaced from a parallel nicol state. In the present invention, one of the pair of stacked polarizing plates, preferably one on the viewing side, has the transmission axes displaced from each other. Accordingly, the contrast ratio can be improved.

The stacked polarizing plates 315 and 316, and the stacked polarizing plates 313 and 314 are attached to the substrate 301 and the counter substrate 320, respectively. A retardation plate may be provided between the stacked polarizing plates and the substrate.

The contrast ratio can be improved by arranging the stacked polarizing plates with their transmission axes displaced in such a liquid crystal display device. By displacing the stacked polarizing plates, the contrast ratio can be made higher than that in a structure in which the film thickness of the polarizing plate of a single-layer structure is simply increased.

This embodiment mode can be freely combined with the above embodiment mode.

Embodiment Mode 8

In this embodiment mode, description is made of a liquid crystal display device which has a polarizing plate having a stacked-layer structure and uses a TFT having an amorphous semiconductor film, differently from the aforementioned embodiment modes.

Figure 10:
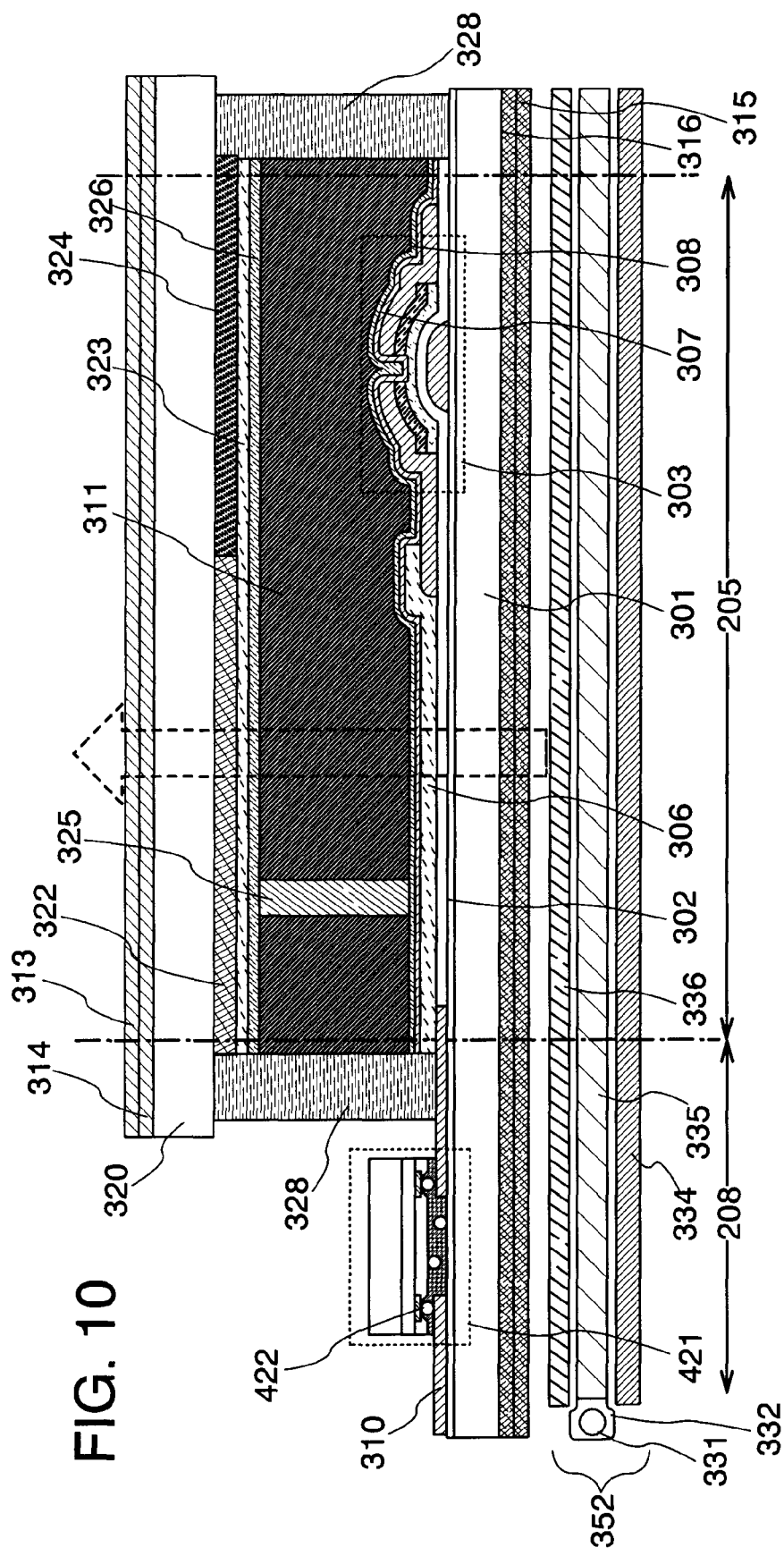
FIG. 10 is a cross-sectional view showing a display device of the present invention.

FIG. 10 shows a structure of a liquid crystal display device including a transistor using an amorphous semiconductor film for a switching element (hereinafter referred to as an amorphous TFT). The pixel portion 205 is provided with the switching TFT 303 formed using an amorphous TFT. The amorphous TFT can be formed by a known method. For example, in the case of a channel-etch type, a gate electrode is formed over the base film 302; a gate insulating film is formed so as to cover the gate electrode; and then, an n-type semiconductor film, an amorphous semiconductor film, a source electrode, and a drain electrode are formed. An opening is formed in the n-type semiconductor film by using the source electrode and the drain electrode. A part of the amorphous semiconductor film is also removed in this case; therefore, this TFT is referred to as a channel-etch type. After that, a protective film 307 is formed, whereby the amorphous TFT can be formed. Further, there is also a channel protective type amorphous TFT where a protective film is provided so that an amorphous semiconductor film is not removed when forming an opening in the n-type semiconductor film by using the source electrode and the drain electrode. Other structures may be formed similarly to the channel-etch type.

Subsequently, the alignment film 308 is formed similarly to FIG. 9, and then rubbing treatment is performed. This rubbing treatment is not performed in some cases in a specific mode of a liquid crystal, for example, in a case of a VA mode.

Further, the counter substrate 320 is provided similarly to FIG. 9 and attached by using the sealing material 328. By injecting the liquid crystal 311 between them, a liquid crystal display device can be formed.

Similarly to FIG. 9, the stacked polarizing plates 315 and 316 are provided between the substrate 301 and the backlight unit 352, and the stacked polarizing plates 313 and 314 are provided over the counter substrate 320 as well. The polarizing plates 315 and 316 on the backlight side are provided so as to be in a parallel nicol state and the polarizing plates 313 and 314 on the viewing side are arranged displaced from a parallel nicol state. In the present invention, one of the pair of stacked polarizing plates, preferably one on the viewing side, has the transmission axes displaced from each other. Accordingly, the contrast ratio can be improved.

The stacked polarizing plates 315 and 316 and the stacked polarizing plates 313 and 314 are attached to the substrate 301 and the counter substrate 320, respectively. In addition, a retardation plate may be provided between the stacked polarizing plates and the substrate.

In the case of forming a liquid crystal display device by using an amorphous TFT as the switching TFT 303, an IC 421 formed using a silicon wafer can be mounted as a driver on the driving circuit portion 208 in consideration of operating performance. For example, a signal to control the switching TFT 303 can be supplied by connecting a wiring of the IC 421 and a wiring connected to the switching TFT 303 by using an anisotropic conductor having a conductive microparticle 422. It is to be noted that a mounting method of the IC is not limited to this and the IC may be mounted by a wire bonding method.

Further, the IC can be connected to a control circuit with the connecting terminal 310 interposed therebetween. At this time, an anisotropic conductive film having the conductive microparticle 422 can be used to connect the IC to the connecting terminal 310.

Since other structures are similar to FIG. 9, description thereof is omitted here.

The contrast ratio can be improved by arranging the stacked polarizing plates with their transmission axes displaced in such a liquid crystal display device. In the present invention, plural polarizing plates are polarizing plates having a stacked layer structure arranged so that their transmission axes are displaced from each other; therefore, the present invention is different from a structure in which the film thickness of the polarizing plate with a single-layer structure is simply increased. Compared with the structure in which the film thickness of the polarizing plate is increased, the present invention is preferable because the contrast ratio can be higher.

This embodiment mode can be freely combined with the above embodiment mode.

Embodiment Mode 9

In this embodiment mode, description is made of an operation of each circuit or the like included in a liquid crystal display device.

Figure 11:
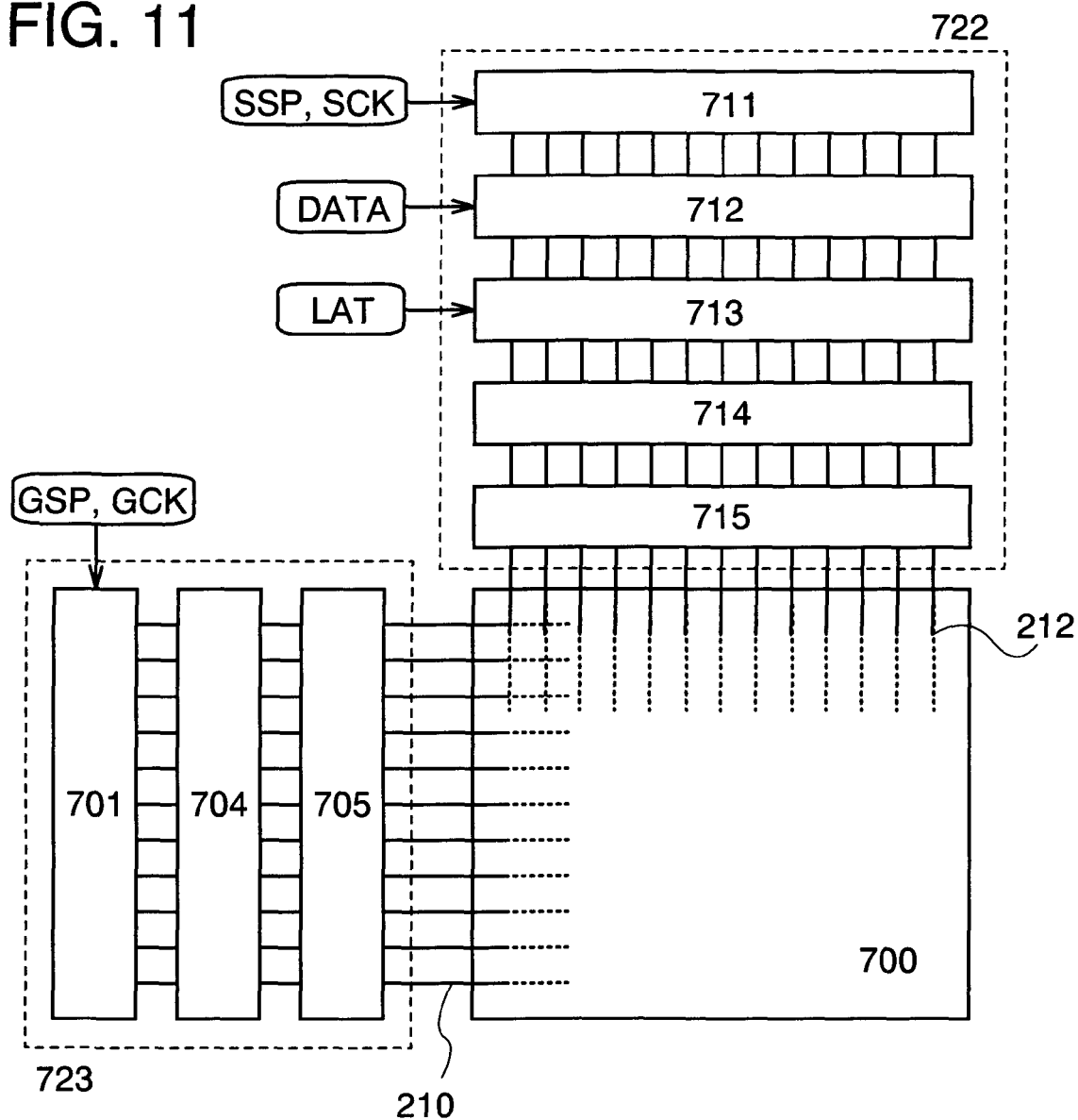
FIG. 11 is a block diagram showing a display device of the present invention.

FIG. 11 is a system block diagram showing a pixel portion 700 and a driving circuit portion of a liquid crystal display device.

In the pixel portion 700, a plurality of pixels are included and a switching element is provided in an intersecting region of a signal line 212 and a scan line 210 which will become each pixel. Application of a voltage to control tilt of a liquid crystal molecule can be controlled by the switching element. Such a structure where a switching element is provided in each intersecting region is referred to as an active type. The pixel portion of the present invention is not limited to such an active type, and may have a passive type structure. The passive type can be formed by a simple process since each pixel does not have a switching element.

The driving circuit portion 208 includes a control circuit, a signal line driving circuit 722, a scan line driving circuit 723, and the like. The control circuit has a function to control a gray scale in accordance with a display content of the pixel portion 700. Therefore, the control circuit inputs a generated signal to the signal line driving circuit 722 and the scan line driving circuit 723. When a switching element is selected through the scan line 210 in accordance with the scan line driving circuit 723, a voltage is applied to a pixel electrode in a selected intersecting region. The value of this voltage is determined based on a signal inputted from the signal line driving circuit 722 through the signal line.

Further, in the control circuit, a signal to control power supplied to a lighting means is generated, and the signal is inputted to a power source of the lighting means. The backlight unit described in the aforementioned embodiment mode can be used for the lighting means. Note that the lighting means includes a front light besides a backlight. A front light is a platy light unit formed of an illuminant and a light guiding body, which is attached to a front side of a pixel portion and illuminates the whole place. By such a lighting means, the pixel portion can be evenly illuminated with low power consumption.

Further, as shown in FIG. 11, the scan line driving circuit 723 includes circuits which function as a shift register 701, a level shifter 704, and a buffer 705. Signals such as a gate start pulse (GSP) and a gate clock signal (GCK) are inputted to the shift register 701. It is to be noted that the scan line driving circuit of the present invention is not limited to the structure shown in FIG. 11.

Further, as shown in FIG. 11, the signal line driving circuit 722 includes circuits which function as a shift register 711, a first latch 712, a second latch 713, a level shifter 714, and a buffer 715. The circuit functioning as the buffer 715 is a circuit having a function to amplify a weak signal and includes an operational amplifier and the like. Signals such as start pulses (SSP) are inputted to the level shifter 714, and data (DATA) of a video signal and the like is inputted to the first latch 712. Latch (LAT) signals can be temporarily held in the second latch 713, and are inputted to the pixel portion 700 concurrently. This operation is referred to as line sequential drive. Therefore, a pixel which performs not line sequential drive but dot sequential drive does not require the second latch. Thus, the signal line driving circuit of the present invention is not limited to the structure shown in FIG. 11.

The signal line driving circuit 722, the scan line driving circuit 723, and the pixel portion 700 as described above can be formed of semiconductor elements provided over one substrate. For example, the semiconductor element can be formed using a thin film transistor provided over a glass substrate. In this case, a crystalline semiconductor film is preferably applied to a semiconductor element (see Embodiment Mode 5). A crystalline semiconductor film can be used to form a circuit included in a driving circuit portion since it has high electrical characteristics, in particular, mobility. Further, the signal line driving circuit 722 and the scan line driving circuit 723 may be mounted on a substrate by using an IC (Integrated Circuit) chip. In this case, an amorphous semiconductor film can be applied to a semiconductor element in a pixel portion (see Embodiment Mode 6).

The contrast ratio can be improved by arranging the stacked polarizing plates with their transmission axes displaced in such a liquid crystal display device.

This embodiment mode can be freely combined with the above embodiment mode.

Embodiment Mode 10

In this embodiment mode, a structure of a backlight is described. A backlight is provided in a display device as a backlight unit having a light source, and the light source of the backlight unit is surrounded by a reflection plate for scattering light efficiently.

Figure 12A:
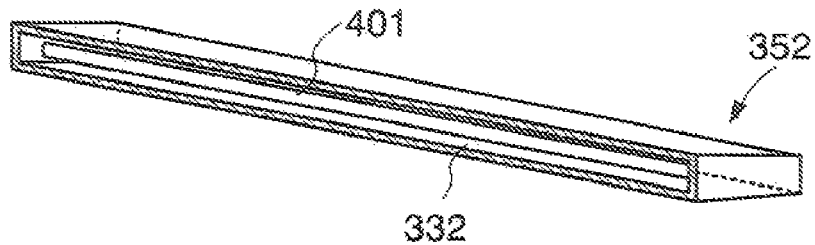
FIGS. 12A to 12D each show an irradiation means of a display device of the present invention.

As shown in FIG. 12A, a cold cathode tube 401 can be used as a light source of the backlight unit 352. In addition, the lamp reflector 332 can be provided to reflect light from the cold cathode tube 401 efficiently. The cold cathode tube 401 is often used for a large display device for intensity of luminance of light from the cold cathode tube. Therefore, such a backlight unit having a cold cathode tube can be used for a display of a personal computer.

Figure 12B:
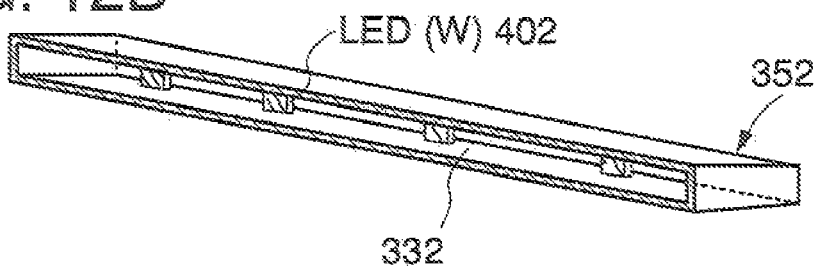

As shown in FIG. 12B, a diode (LED) can be used as light sources of the backlight unit 352. For example, diodes (W) 402 which emit white light are provided at predetermined intervals. In addition, the lamp reflector 332 can be provided to reflect light from the diodes (W) 402 efficiently.

Figure 12C:
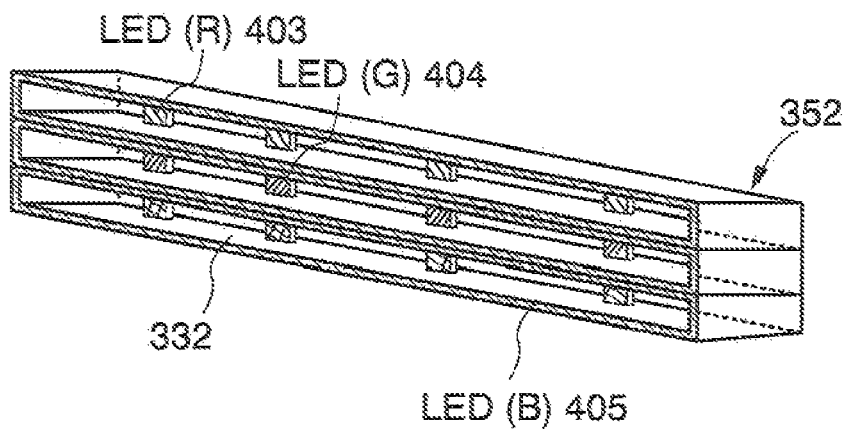

As shown in FIG. 12C, diodes (LEDs) 403, 404, and 405 of RGB colors can be used as light sources of the backlight unit 352. By using the diodes (LEDs) 403, 404, and 405 of RGB colors, higher color reproducibility can be realized in comparison with a case of using only the diodes (W) 402 which emit white light. In addition, the lamp reflector 332 can be provided to reflect light from the diodes (W) 402 efficiently.

Figure 12D:
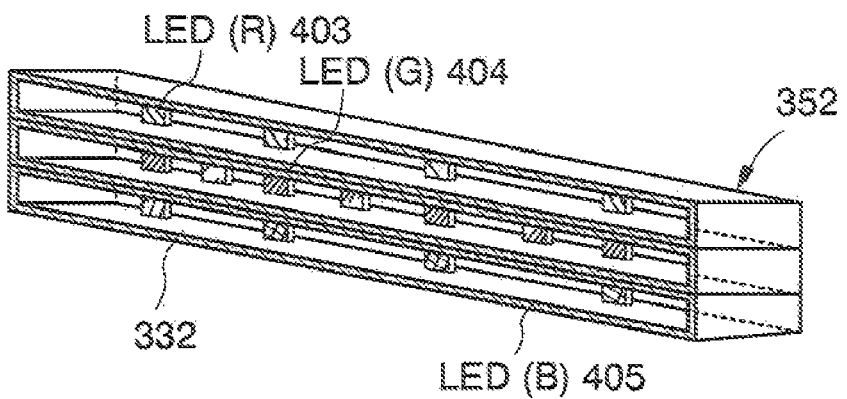

Further, as shown in FIG. 12D, in the case where the diodes (LEDs) 403, 404, and 405 of RGB colors are used as light sources, the number and arrangement of them are not necessarily the same. For example, a plurality of diodes of a color having low emission intensity (for example, green) may be arranged.

Further, the diode (W) 402 which emits white light may be used in combination with the diodes (LED) 403, 404, and 405 of RGB colors.

Note that in the case of having the diodes of RGB colors, the diodes are sequentially lighted in accordance with time by applying a field sequential mode, whereby color display can be performed.

Using a diode is suitable for a large display device since the luminance is high. Further, since the color purity of RGB colors is high, a diode has excellent color reproducibility as compared to a cold cathode tube. In addition, an area required for arrangement can be reduced; therefore, a narrower frame can be achieved when a diode is applied to a small display device.

Further, a light source is not necessarily provided as the backlight unit shown in FIGS. 12A to 12D. For example, in the case where a backlight having a diode is mounted on a large display device, the diode can be arranged on a back side of the substrate. In this case, the diodes of RGB colors can be sequentially arranged at predetermined intervals. Depending on arrangement of the diodes, color reproducibility can be enhanced.

Stacked polarizing plates are arranged with their transmission axes displaced in such a display device using a backlight, whereby an image with a high contrast ratio can be produced. In particular, a backlight having a diode is suitable for a large display device. By increasing the luminance of white display of a large display device, a high-quality image can be produced even in a dark place.

This embodiment mode can be freely combined with the above embodiment mode.

Embodiment Mode 11

Driving methods of a liquid crystal of a liquid crystal display device include a vertical electric field method where a voltage is applied perpendicular to a substrate and a horizontal electric field method where a voltage is applied in parallel to a substrate. Either the vertical electric field method or the horizontal electric field method can be applied to a structure in which polarizing plates are arranged with their transmission axes displaced. In this embodiment mode, description is made of various liquid crystal modes to which stacked polarizing plates arranged with their transmission axes displaced can be applied.

Figure 23A:
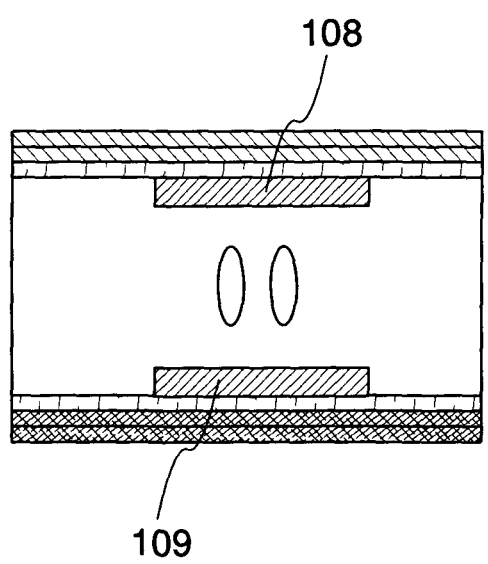
FIGS. 23A and 23B are schematic views each showing a mode of a liquid crystal element of the present invention.
Figure 23B:
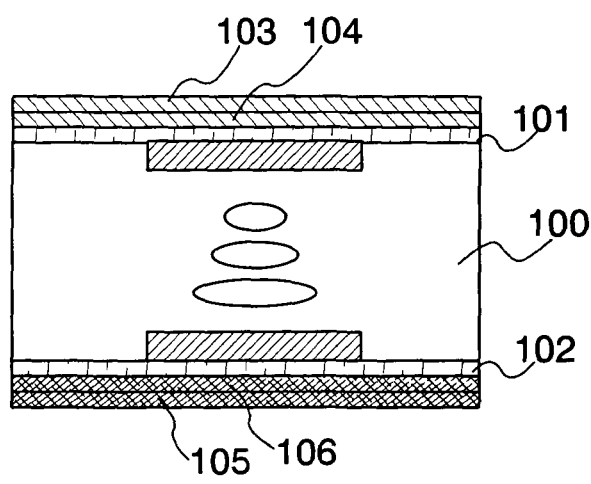

First, FIGS. 23A and 23B are pattern diagrams each showing a liquid crystal display device of a TN mode.

In a similar manner to the above embodiment mode, the layer 100 having a display element is sandwiched between the first substrate 101 and the second substrate 102 that are provided so as to face each other. On the first substrate 101 side, the first polarizing plate 103 and the second polarizing plate 104 are arranged displaced from a parallel nicol state. Meanwhile, on the second substrate 102 side, the third polarizing plate 105 and the fourth polarizing plate 106 are arranged so as to be in a parallel nicol state. It is to be noted that the first polarizing plate 103 and the third polarizing plate 105 are arranged so as to be in a cross nicol state.

Although not shown, a backlight and the like are provided outside the fourth polarizing plate 106. A first electrode 108 and a second electrode 109 are provided over the first substrate 101 and the second substrate 102, respectively. In addition, an electrode on the side opposite to the backlight, that is, an electrode on the viewing side, such as the first electrode 108, is formed so as to have at least a light-transmitting property.

In the case where a liquid crystal display device having such a structure is in a normally white mode, when a voltage is applied to the first electrode 108 and the second electrode 109 (referred to as a vertical electric field method), black display is performed as shown in FIG. 23A. At that time, liquid crystal molecules are aligned vertically. Thus, light from the backlight cannot pass through the substrate, which leads to black display.

Then, when a voltage is not applied between the first electrode 108 and the second electrode 109 as shown in FIG. 23B, white display is performed. At this time, liquid crystal molecules are aligned horizontally and are in a twisted state in a plane. Accordingly, light from the backlight can pass through the substrate over which one of a pair of polarizing plates, which is stacked on the viewing side, is provided displaced from a parallel nicol state; therefore, a predetermined image can be displayed.

By providing a color filter at that time, full-color display can be performed. The color filter can be provided on either the first substrate 101 side or the second substrate 102 side.

A known liquid crystal material may be used for a TN mode.

Figure 24A:
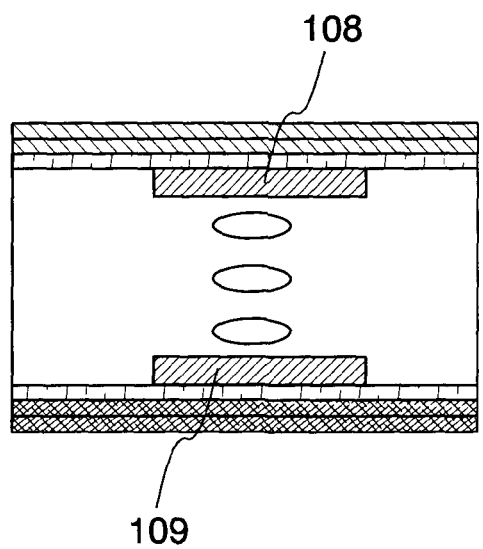
FIGS. 24A and 24B are schematic views each showing a mode of a liquid crystal element of the present invention.
Figure 24B:
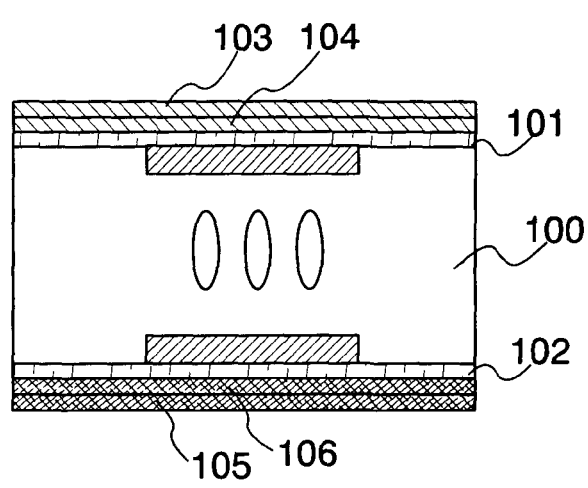

FIGS. 24A and 24B are pattern diagrams each showing a liquid crystal display device of a VA mode. A VA mode is a mode where liquid crystal molecules are aligned perpendicularly to a substrate when there is no electric field.

Similarly to FIGS. 23A and 23B, the first electrode 108 and the second electrode 109 are provided over the first substrate 101 and the second substrate 102, respectively. In addition, an electrode on the side opposite to the backlight, that is, an electrode on the viewing side, such as the first electrode 108, is formed so as to have at least a light-transmitting property. The first polarizing plate 103 and the second polarizing plate 104 are arranged displaced from a parallel nicol state. On the second substrate 102 side, the third polarizing plate 105 and the fourth polarizing plate 106 are arranged so as to be in a parallel nicol state. The first polarizing plate 103 and the third polarizing plate 105 are arranged so as to be in a cross nicol state.

When a voltage is applied to the first electrode 108 and the second electrode 109 (vertical electric field method) in a liquid crystal display device having such a structure, white display is performed, which means an on state, as shown in FIG. 24A. At that time, liquid crystal molecules are aligned horizontally. Thus, light from the backlight can pass through the substrate provided with the stacked polarizing plates arranged displaced from a parallel nicol state, whereby a predetermined image is displayed. By providing a color filter at that time, full-color display can be performed. The color filter can be provided on either the first substrate 101 side or the second substrate 102 side.

As shown in FIG. 24B, when a voltage is not applied between the first electrode 108 and the second electrode 109, black display is performed, which means an off state. At that time, liquid crystal molecules are aligned vertically. Thus, light from the backlight cannot pass through the substrate, which leads to black display.

Thus, in an off state, liquid crystal molecules rise to be perpendicular to a substrate, whereby black display is performed. Meanwhile, in an on state, liquid crystal molecules lie down to be parallel to a substrate, whereby white display is performed. In an off state, liquid crystal molecules rise; therefore, polarized light from the backlight passes through a cell without being affected by the liquid crystal molecules, and can be completely blocked by the polarizing plates on a counter substrate side. Accordingly, further enhancement of contrast is anticipated by providing a pair of stacked polarizing plates in such a way that at least one of the pair of stacked polarizing plates is arranged displaced from a parallel nicol state.

Moreover, the stacked polarizing plates of the present invention can be applied to an MVA (Multi-domain Vertical Alignment) mode in which the alignment of liquid crystal molecules is divided.

A known liquid crystal material may be used for a VA (Vertical Alignment) mode or an MVA mode.

Figure 25A:
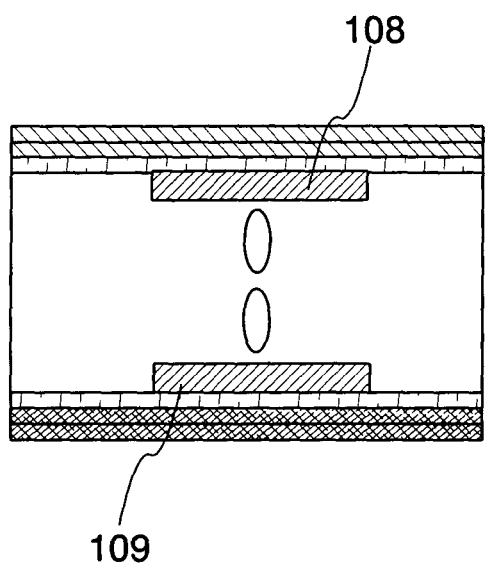
FIGS. 25A and 25B are schematic views each showing a mode of a liquid crystal element of the present invention.
Figure 25B:
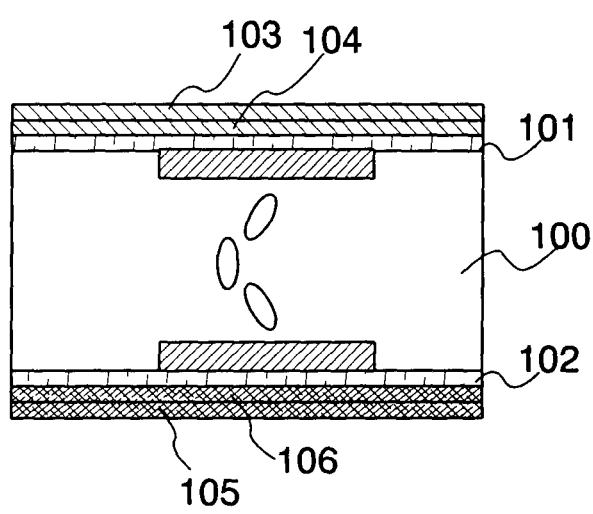

FIGS. 25A and 25B are pattern diagrams each showing a liquid crystal display device of an OCB (Optical Compensated Bend) mode. In the OCB mode, alignment of liquid crystal molecules forms a compensation state optically in a liquid crystal layer, which is referred to as bend alignment.

Similarly to FIGS. 23A and 23B, the first electrode 108 and the second electrode 109 are provided over the first substrate 101 and the second substrate 102, respectively. Moreover, although not shown, the backlight and the like are provided outside the fourth polarizing plate 106. In addition, an electrode on the side opposite to the backlight, that is, an electrode on the viewing side, such as the first electrode 108, is formed so as to have at least a light-transmitting property. The first polarizing plate 103 and the second polarizing plate 104 are arranged displaced from a parallel nicol state. The third polarizing plate 105 and the fourth polarizing plate 106 are arranged so as to be in a parallel nicol state on the second substrate 102 side. The first polarizing plate 103 and the third polarizing plate 105 are arranged so as to be in a cross nicol state.

When a voltage is applied to the first electrode 108 and the second electrode 109 (vertical electric field method) in a liquid crystal display device having such a structure, black display is performed as shown in FIG. 25A. At that time, liquid crystal molecules are aligned vertically. Thus, light from the backlight cannot pass through the substrate, which leads to black display.

When a voltage is not applied between the first electrode 108 and the second electrode 109, white display is performed as shown in FIG. 25B. At that time, liquid crystal molecules are aligned tilted. Thus, light from the backlight can pass through the substrate provided with the stacked polarizing plates, whereby a predetermined image is displayed. By providing a color filter at that time, full-color display can be performed. The color filter can be provided on either the first substrate 101 side or the second substrate 102 side.

In such an OCB mode, birefringence caused in a liquid crystal layer can be compensated by providing a pair of stacked polarizing plates in such a way that one of the pair of stacked polarizing plates on the viewing side is arranged displaced from a parallel nicol state. Accordingly, a wider viewing angle can be realized, and a contrast ratio can be enhanced.

Figure 26A:
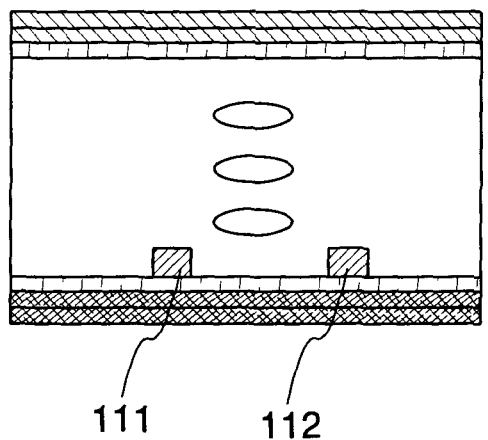
FIGS. 26A and 26B are schematic views each showing a mode of a liquid crystal element of the present invention.
Figure 26B:
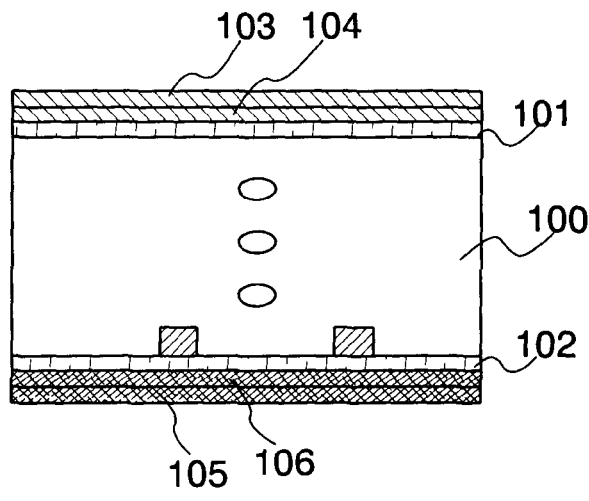

FIGS. 26A and 26B are pattern diagrams each showing a liquid crystal display device of an IPS (In-Plane Switching) mode. In the IPS mode, liquid crystal molecules are twisted normally in a plane with respect to a substrate, and a horizontal electric field method where electrodes are provided on one substrate side is employed.

In the IPS mode, a liquid crystal is controlled by a pair of electrodes provided over one substrate. Therefore, a pair of electrodes 111 and 112 is provided over the second substrate 102. The pair of electrodes 111 and 112 preferably has a light-transmitting property. The first polarizing plate 103 and the second polarizing plate 104 are arranged displaced from a parallel nicol state. On the second substrate 102 side, the third polarizing plate 105 and the fourth polarizing plate 106 are arranged so as to be in a parallel nicol state. The first polarizing plate 103 and the third polarizing plate 105 are arranged so as to be in a cross nicol state. Moreover, although not shown, the backlight and the like are provided outside the fourth polarizing plate 106.

When a voltage is applied to the pair of electrodes 111 and 112 in a liquid crystal display device having such a structure, white display is performed, which means an on state, as shown in FIG. 26A. Accordingly, light from the backlight can pass through the substrate over which one of a pair of polarizing plates, which is stacked on the viewing side, is arranged displaced from a parallel nicol state; therefore, a predetermined image can be displayed.

By providing a color filter at that time, full-color display can be performed. The color filter can be provided on either the first substrate 101 side or the second substrate 102 side.

When a voltage is not applied between the pair of electrodes 111 and 112, black display is performed, which means an off state, as shown in FIG. 26B. At that time, liquid crystal molecules are aligned horizontally and are in a twisted state in a plane. As a result, light from the backlight cannot pass through the substrate, which leads to black display.

A known liquid crystal material may be used for the IPS mode.

Display with a higher contrast ratio can be achieved by applying a pair of stacked polarizing plates of the present invention to a liquid crystal display device of the vertical electric field method in such a way that one of the pair of stacked polarizing plates on the viewing side is arranged displaced from a parallel nicol state. The vertical electric field method is suitable for a display device for a computer and a large-sized television which are used indoors.

When the present invention is applied to a liquid crystal display device of the horizontal electric field method, display with a wider viewing angle and a higher contrast ratio can be realized. The horizontal electric field method is preferable for a portable display device.

Figure 27A:
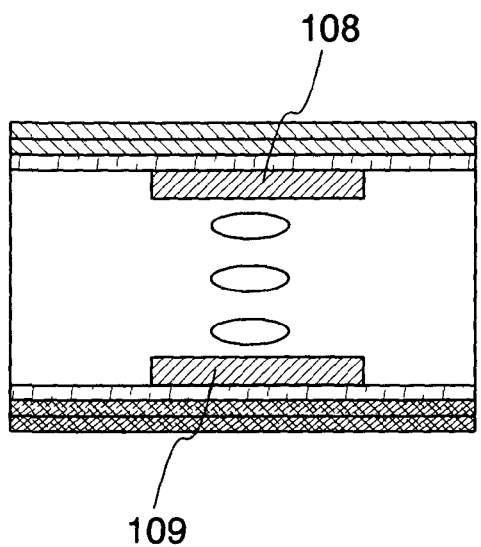
FIGS. 27A and 27B are schematic views each showing a mode of a liquid crystal element of the present invention.
Figure 27B:
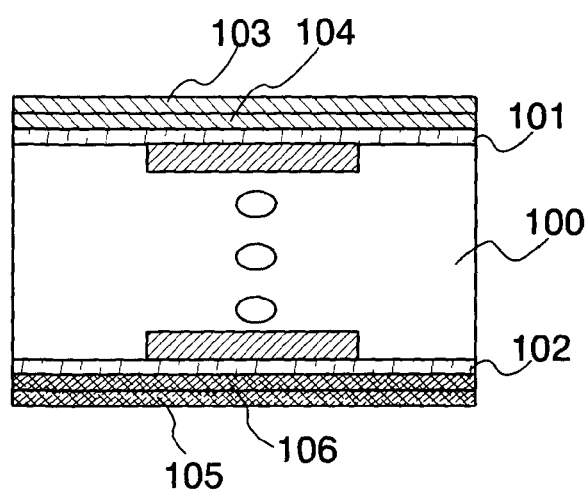

FIGS. 27A and 27B are pattern diagrams each showing a liquid crystal of an FLC (Ferroelectric Liquid Crystal) mode and an AFLC (Antiferroelectric Liquid Crystal) mode.

Similarly to FIGS. 23A and 23B, the first electrode 108 and the second electrode 109 are provided over the first substrate 101 and the second substrate 102, respectively. In addition, an electrode on the side opposite to the backlight, that is, the first electrode 108 on the viewing side is formed so as to have at least a light-transmitting property. The first polarizing plate 103 and the second polarizing plate 104 are arranged displaced from a parallel nicol state. On the second substrate 102 side, the third polarizing plate 105 and the fourth polarizing plate 106 are arranged so as to be in a parallel nicol state. The first polarizing plate 103 and the third polarizing plate 105 are arranged so as to be in a cross nicol state.

When a voltage is applied to the first electrode 108 and the second electrode 109 (referred to as the vertical electric field method) in a liquid crystal display device having such a structure, white display is performed as shown in FIG. 27A. At that time, liquid crystal molecules are aligned horizontally and are in a twisted state in a plane. Accordingly, light from the backlight can pass through the substrate over which one of a pair of polarizing plates, which is stacked on the viewing side, is provided displaced from a parallel nicol state; therefore, a predetermined image can be displayed.

Meanwhile, when a voltage is not applied between the first electrode 108 and the second electrode 109, black display is performed as shown in FIG. 27B. At this time, the liquid crystal molecules are aligned horizontally. Then, light from the backlight cannot pass through the substrate, thereby performing black display.

By providing a color filter at that time, full-color display can be performed. The color filter can be provided on either the first substrate 101 side or the second substrate 102 side.

A known liquid crystal material may be used for the FLC mode and the AFLC mode.

Besides, the invention can be applied to a liquid crystal display device of a rotation mode, a scattering mode, or a birefringence mode, and a display device in which a polarizing plate is provided on each side of a substrate.

This embodiment mode can be freely combined with the above embodiment mode.

Embodiment Mode 12

An electronic appliance of the present invention includes: a television set (also simply referred to as a TV or a television receiver), a camera such as a digital camera and a digital video camera, a mobile phone set (also simply referred to as a cellular phone set or a cellular phone), a portable information terminal such as a PDA, a portable game machine, a monitor for a computer, a computer, an audio reproducing device such as a car audio set, an image reproducing device provided with a recording medium such as a home-use game machine, and the like. Specific examples thereof are described with reference to FIGS. 28A to 28F.

Figure 28A:
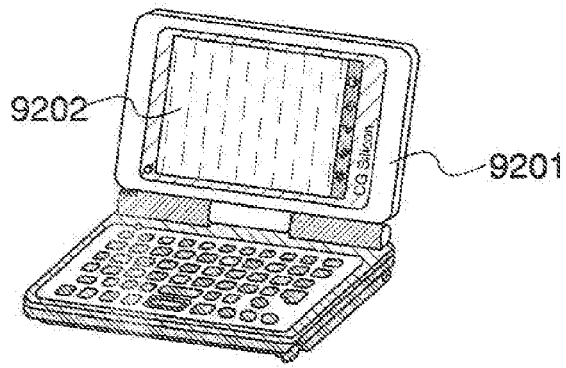
FIGS. 28A to 28F show electronic appliances of the present invention.

A portable information terminal shown in FIG. 28A includes a main body 9201, a display portion 9202, and the like. The display device of the invention can be applied to the display portion 9202. Thus, a portable information terminal with a high contrast ratio can be provided.

Figure 28B:
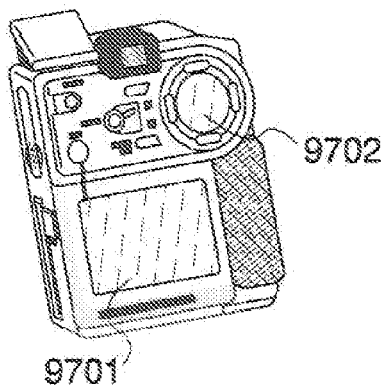

A digital video camera shown in FIG. 28B includes a display portion 9701, a display portion 9702, and the like. The display device of the invention can be applied to the display portion 9701. Thus, a digital video camera with a high contrast ratio can be provided.

Figure 28C:
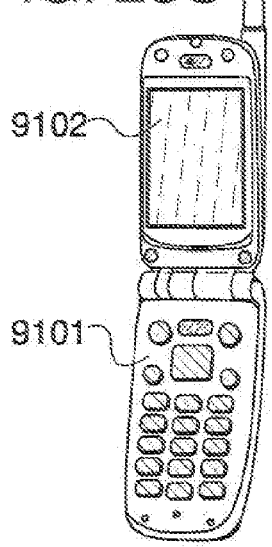

A cellular phone set shown in FIG. 28C includes a main body 9101, a display portion 9102, and the like. The display device of the invention can be applied to the display portion 9102. Thus, a cellular phone set with a high contrast ratio can be provided.

Figure 28D:
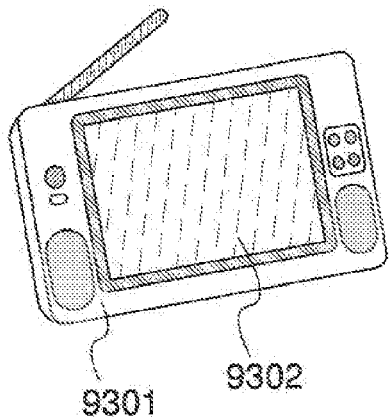

A portable television set shown in FIG. 28D includes a main body 9301, a display portion 9302, and the like. The display device of the invention can be applied to the display portion 9302. Thus, a portable television set with a high contrast ratio can be provided. The display device of the invention can be applied to various types of television sets including a small-sized television incorporated in a portable terminal such as a cellular phone set, a medium-sized television which is portable, and a large-sized television (for example, 40 inches in size or more).

Figure 28E:
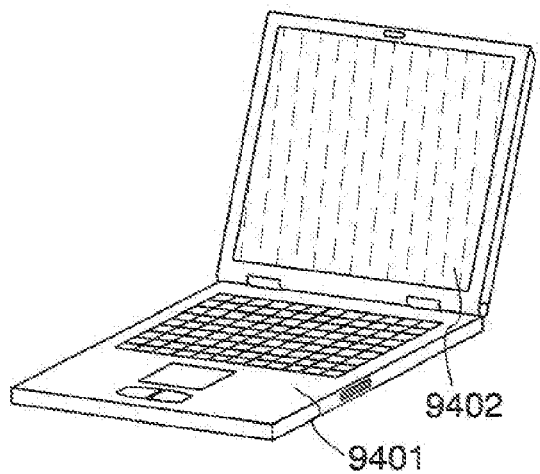

A portable computer shown in FIG. 28E includes a main body 9401, a display portion 9402, and the like. The display device of the invention can be applied to the display portion 9402. Thus, a portable computer with a high contrast ratio can be provided.

Figure 28F:
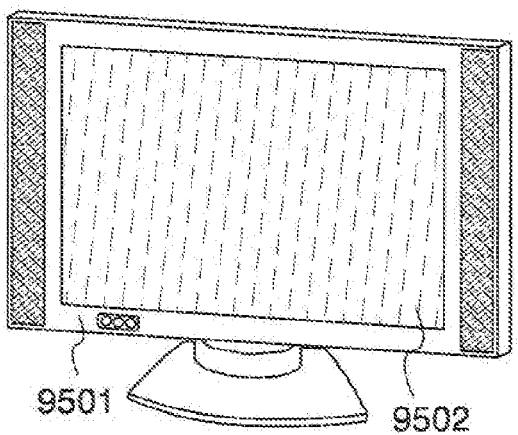

A television set shown in FIG. 28F includes a main body 9501, a display portion 9502, and the like. The display device of the invention can be applied to the display portion 9502. Thus, a television set with a high contrast ratio can be provided.

In this manner, an electronic appliance with a high contrast ratio can be provided by using the display device of the present invention.

Embodiment 1

Embodiment 1 will show results of optical calculation with respect to a TN liquid crystal element having stacked polarizing plates.

First, a liquid crystal element as a target of the optical calculation was formed as shown in FIG. 13. A polarizing plate 1, a polarizing plate 2, a TN liquid crystal 1001, a polarizing plate 3, and a polarizing plate 4 were stacked in order from a backlight 1000. That is to say, two polarizing plates which have been stacked were provided on each side of the TN liquid crystal in this liquid crystal element. The TN liquid crystal has an anisotropy of dielectric constant $\Delta\epsilon=5.2$. Then, the liquid crystal element has a cell thickness of 4 μm. It is to be noted that Chart 1 shows values of birefringence $\Delta n$ of the TN liquid crystal at a wavelength of 546.1 nm. It is understood from Chart 1 that the birefringence changes depending on temperature.

CHART 1

| Temperature [° C.] | $\Delta n$ |
| --- | --- |
| 20 | 0.099 |
| 25 | 0.097 |
| 40 | 0.092 |
| 60 | 0.083 |

As each of the polarizing plates, EG1425DU in the database of LCD MASTER with its film thickness set to 180 μm was used. In such a liquid crystal element, a rubbing direction was set perpendicular to an absorption axis of each polarizing plate, i.e., parallel to a transmission-axis direction on the backlight side and a viewing side, so as to be in a normally white mode.

At this time, the absorption axes of the polarizing plate 1 and the polarizing plate 2 provided on the backlight side were arranged at 135° to a reference line. Moreover, the absorption axis of the polarizing plate 3 provided on the viewing side was arranged at 45° to a reference line, i.e., the polarizing plate 3 was arranged so as to be in a cross nicol state with respect to the polarizing plate 1 and the polarizing plate 3. Then, the angle of the absorption axis of the polarizing plate 4 was gradually displaced from the state of 45° to the reference line. That is to say, the absorption axis of the polarizing plate 4 was gradually displaced from that of the polarizing plate 3. The optical calculation was carried out in this state.

Figure 14:
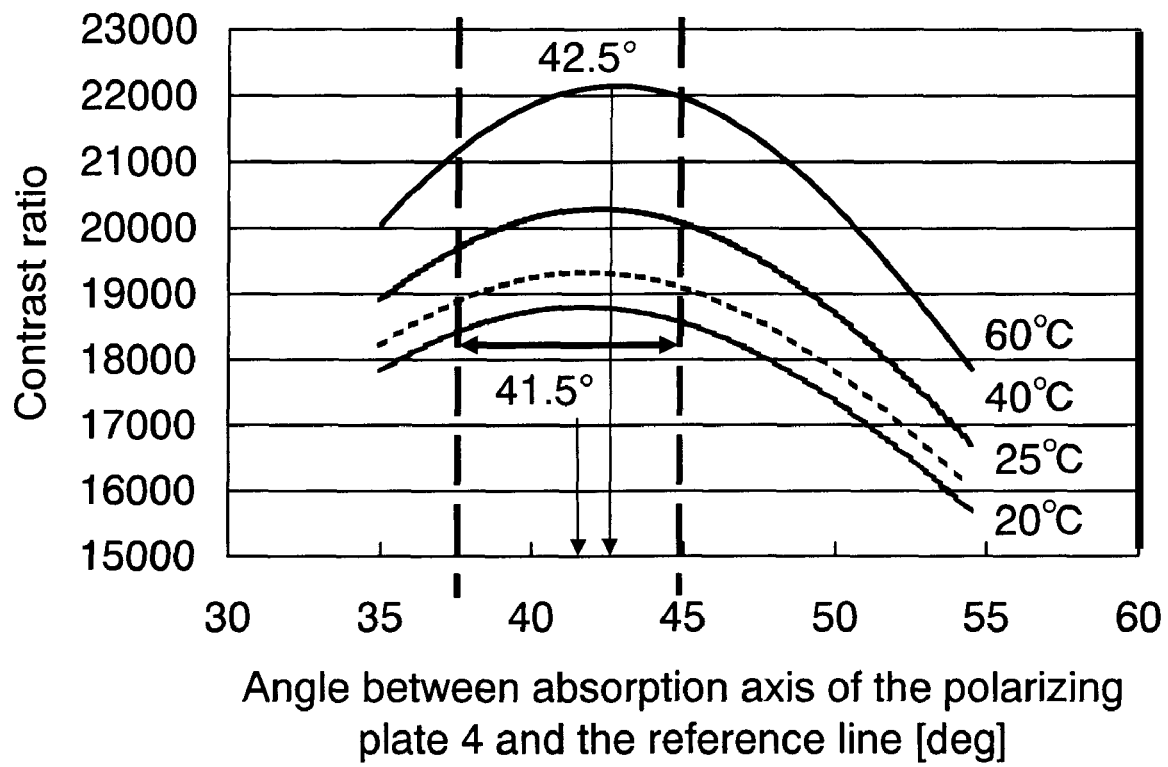
FIG. 14 is a graph showing an experiment result of the present invention.

FIG. 14 shows a result of a contrast ratio with respect to the angle between the absorption axis of the polarizing plate 4 and the reference line. The optical calculation was carried out with the angle between the absorption axis and the reference line ranging from 35° to 55°. The contrast ratio is calculated from the relative ratio between the luminance of white display and that of black display. In order to perform black display, a voltage of 4.5 V (ON voltage) was applied to the liquid crystal element; on the other hand, in order to perform white display, a voltage of 1.7 V (OFF voltage) was applied to the liquid crystal element. Then, the contrast ratio of the liquid crystal element was measured with the temperature of the TN liquid crystal set to 20° C., 25° C., 40° C., and 60° C.

It is understood from FIG. 14 that the contrast ratio differs depending on the temperature of the TN liquid crystal. For example, it is when the angle between the absorption axis of the polarizing plate 4 and the reference line is 41.5° that the contrast ratio is the maximum at 20° C. Moreover, it is when the angle between the absorption axis of the polarizing plate 4 and the reference line is 42.5° that the contrast ratio is the maximum at 60° C. It is understood from FIG. 14 that the angle between the absorption axis of the polarizing plate 4 and the reference line is 38° to 45°, that is, the angle between the absorption axis of the polarizing plate 4 and the absorption axis of the polarizing plate 3 is within 7°, preferably within 5°, in order to increase the contrast ratio so as to be higher than contrast ratio when the angle between the absorption axis of the polarizing plate 4 and the reference line is 45°.

It is understood that the contrast ratio is increased by displacing the stacked polarizing plates in this manner Moreover, it is understood that when the stacked polarizing plates are displaced, the contrast ratio shows temperature dependency with respect to the angle of the absorption axis of the polarizing plate 4 at which the contrast ratio is the maximum.

Embodiment 2

Embodiment 2 shows results of optical calculation on temperature dependency with respect to the contrast ratio. Here, description is made of a method for fixing the contrast ratio without depending on the temperature while the stacked polarizing plates are displaced.

Figure 15:
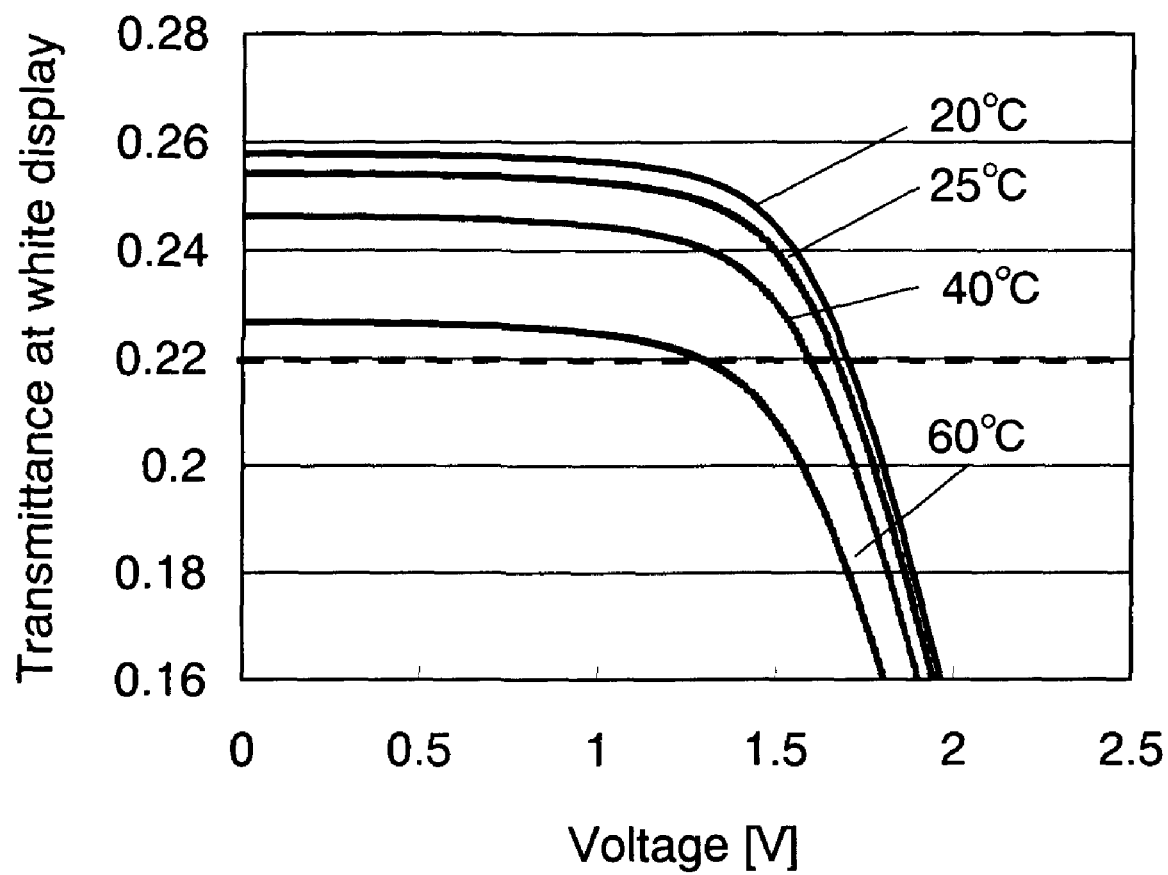
FIG. 15 is a graph showing an experiment result of the present invention.

FIG. 15 shows transmittance at white display with respect to an applied voltage when the angle between the reference line and the absorption axis of the polarizing plate 4 shown in FIG. 13 is 41.5°. It is understood that the transmittance at white display gets lower with the increase in temperature of the TN liquid crystal. In order to fix the contrast ratio with respect to the temperature of the TN liquid crystal, the transmittance at white display may be fixed. For example, the transmittance at white display is fixed at 0.22.

Chart 2 shows specific values of a voltage applied to the liquid crystal element for performing white display with respect to each temperature of the TN liquid crystal.

CHART 2

| Temperature [° C.] | Applied Voltage [V] |
|---|---|
| 20 | 1.70 |
| 25 | 1.67 |
| 40 | 1.59 |
| 60 | 1.28 |

Figure 16:
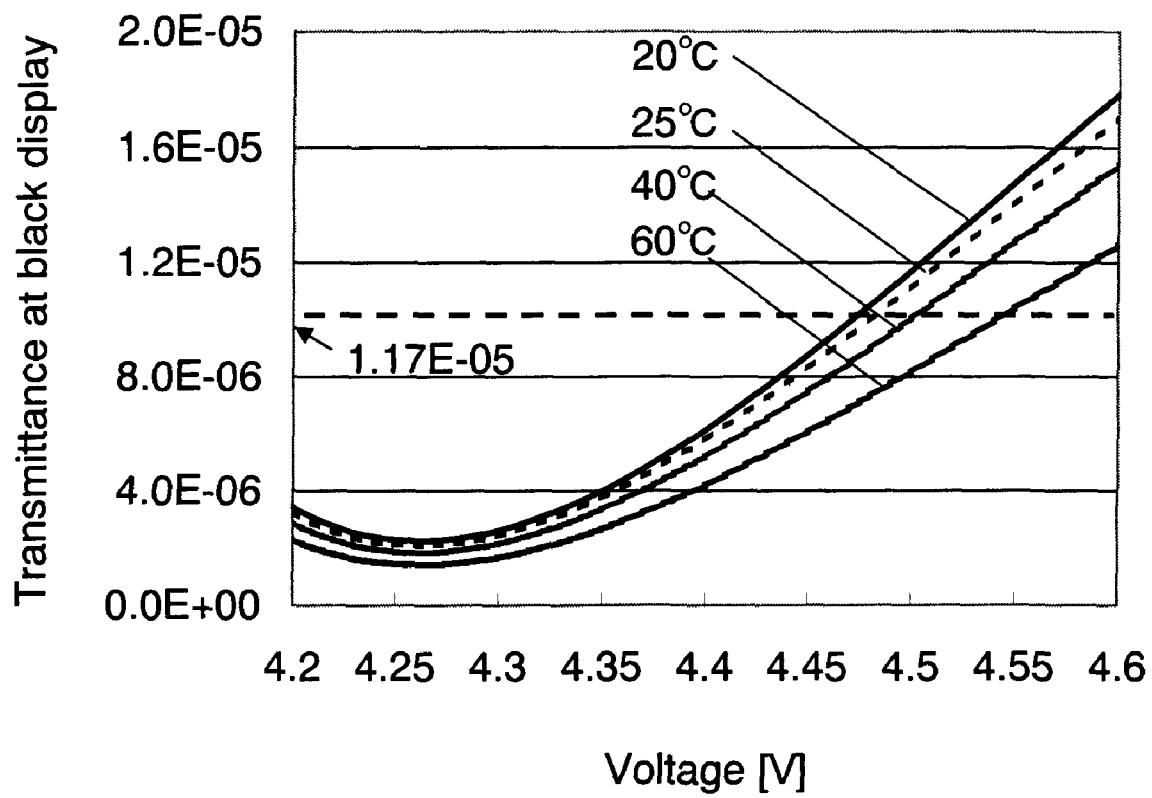
FIG. 16 is a graph showing an experiment result of the present invention.

Next, FIG. 16 shows transmittance at black display with respect to an applied voltage when the angle between the reference line and the absorption axis of the polarizing plate 4 is 41.5°. It is understood that the transmittance at black display gets lower with the increase in temperature of the TN liquid crystal. In order to fix the contrast ratio with respect to the temperature of the TN liquid crystal, the transmittance at black display may be fixed. For example, the transmittance at black display is fixed at $1.17 \times 10^{-5}$.

Chart 3 shows specific values of a voltage applied to the liquid crystal element for performing black display with respect to each temperature of the TN liquid crystal.

CHART 3

| Temperature [° C.] | Applied Voltage [V] |
|---|---|
| 20 | 4.50 |
| 25 | 4.51 |
| 40 | 4.53 |
| 60 | 4.58 |

Figure 17:
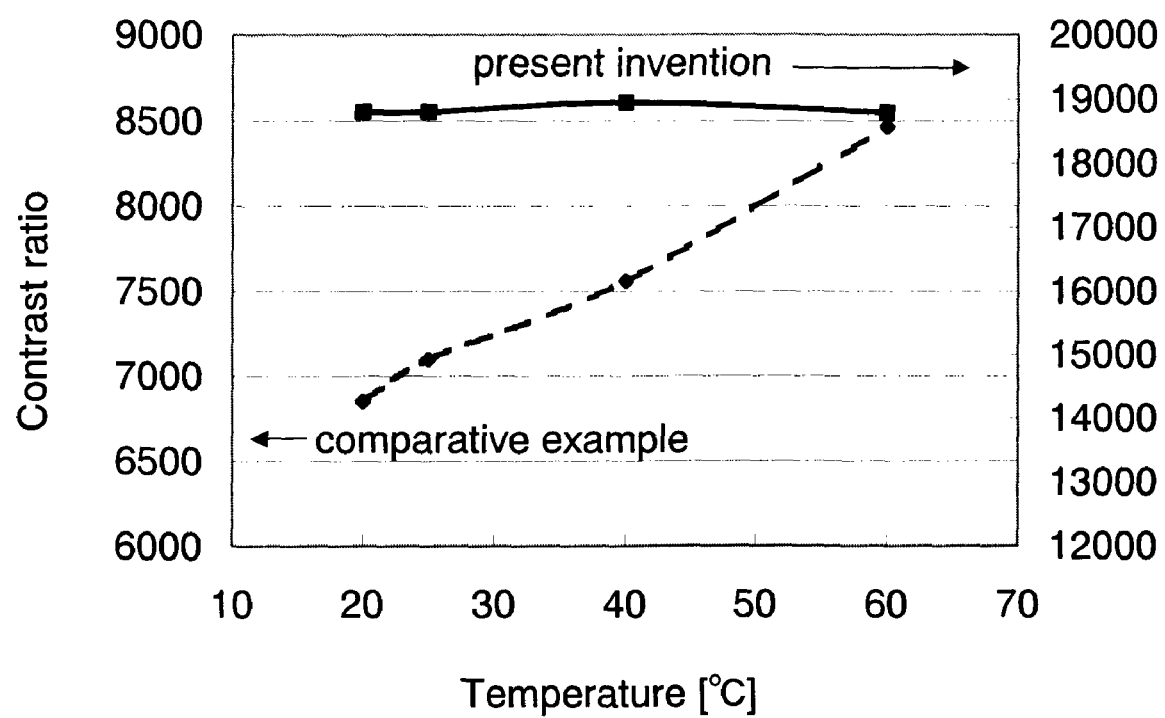
FIG. 17 is a graph showing an experiment result of the present invention.

Next, FIG. 17 shows results of plotting a contrast ratio with respect to the temperature of the TN liquid crystal. Also in this measurement, the polarizing plate 4 was provided with its absorption axis set at 41.5° to the reference line, i.e., the polarizing plate 4 was arranged displaced, so as to obtain a high contrast ratio. Moreover, as shown in Charts 2 and 3, a voltage applied to the liquid crystal element was controlled so that the transmittance at white display and the transmittance at black display were fixed with respect to the temperature of the TN liquid crystal. As a comparative example, a result of a comparative element which is arranged so that the angle between the absorption axis of the polarizing plate 4 and the reference line is 45° is shown. In the comparative element, regardless of the temperature, a voltage of 0 V was applied to perform black display and a voltage of 5 V was applied to perform white display.

It is understood from FIG. 17 that a high contrast ratio can be obtained in the liquid crystal element of the present invention and a fixed contrast ratio can be obtained at temperatures of the TN liquid crystal ranging from 20° C. to 60° C. On the other hand, it is understood that the comparative element has a low contrast ratio and the contrast ratio thereof changes depending on the temperature of the TN liquid crystal.

Thus, it is understood that the liquid crystal element of the present invention has a high contrast ratio. Although the contrast ratio changes depending on the temperature of the TN liquid crystal, it is understood that drive voltage is desirably controlled so as to maintain a fixed contrast ratio. In order to control the drive voltage, an element for detecting the transmittance may be provided in the display device and the drive voltage may be controlled based on a detection result. As the element for detecting the transmittance, a photosensor including an IC chip can be used. In the display device, an element for detecting temperature may be provided and the drive voltage may be controlled based on a detection result and the change in a contrast ratio with respect to the temperature of the liquid crystal element. As the element for detecting the temperature, a temperature sensor including an IC chip can be used. In this case, the element for detecting the transmittance and the element for detecting the temperature are preferably arranged so as to be hidden in the housing of the display device.

Embodiment 3

Embodiment 3 will show results of optical calculation with respect to a VA liquid crystal element having stacked polarizing plates.

Figure 18:
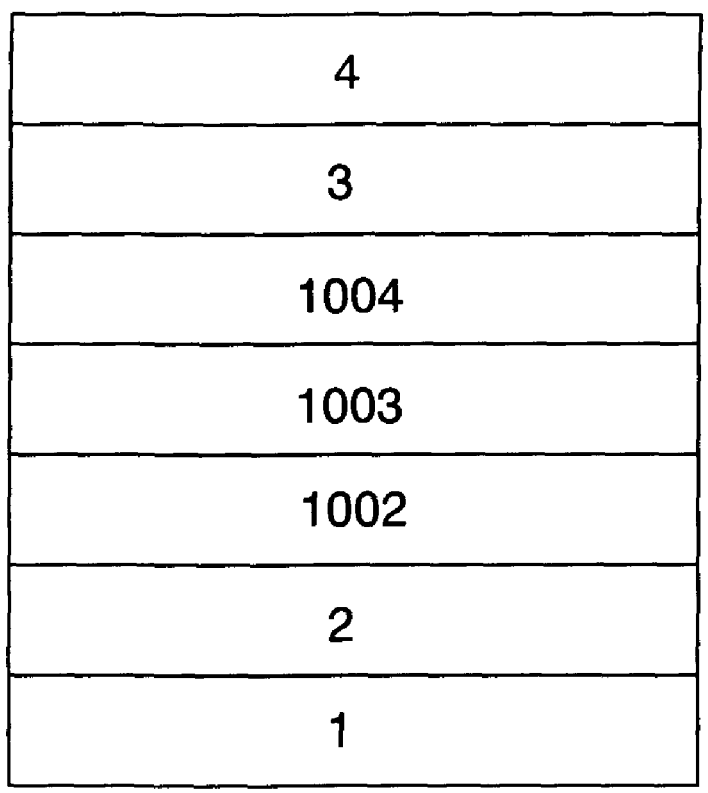
FIG. 18 shows an experiment condition of the present invention.

First, as shown in FIG. 18, a liquid crystal element as a target of the optical calculation was formed. A polarizing plate 1, a polarizing plate 2, a retardation plate 1002, a VA liquid crystal 1003, a retardation plate 1004, a polarizing plate 3, and a polarizing plate 4 were stacked in order from a backlight 1000. That is to say, a retardation plate and two polarizing plates which have been stacked are provided on each side of the VA liquid crystal in this liquid crystal element. In this embodiment, the retardation plate was inserted in order to improve a viewing angle that affects a polarizing state of incident light. The VA liquid crystal has an anisotropy of dielectric constant $\Delta\epsilon = -4.3$. Then, the liquid crystal element has a cell thickness of 2.44 μm. It is to be noted that Chart 4 shows values of birefringence of the VA liquid crystal at a wavelength of 546.1 nm. It is understood from Chart 4 that the birefringence changes depending on temperature.

CHART 4

| Temperature [° C.] | Δn |
| --- | --- |
| 20 | 0.1300 |
| 40 | 0.1208 |
| 50 | 0.1155 |
| 60 | 0.1088 |

As each of the polarizing plates, EG1425DU in the database of LCD MASTER with its film thickness set to 180 μm was used. In such a liquid crystal element, the pretilt angle is set to 88°.

In this case, the polarizing plate 1 and the polarizing plate 2 on the backlight side were arranged so that the absorption axis of each of the polarizing plates 1 and 2 has an angle of 45° to a reference line. Moreover, the polarizing plate 3 was provided on the viewing side so that the absorption axis of the polarizing plate 3 has an angle of 135° to the reference line, i.e., the polarizing plate 3 was arranged in a cross nicol state with respect to the polarizing plate 1 and the polarizing plate 3. Then, the angle of the absorption axis of the polarizing plate 4 was gradually displaced from the state of 135° to the reference line. The optical calculation was carried out in this state.

Figure 19:
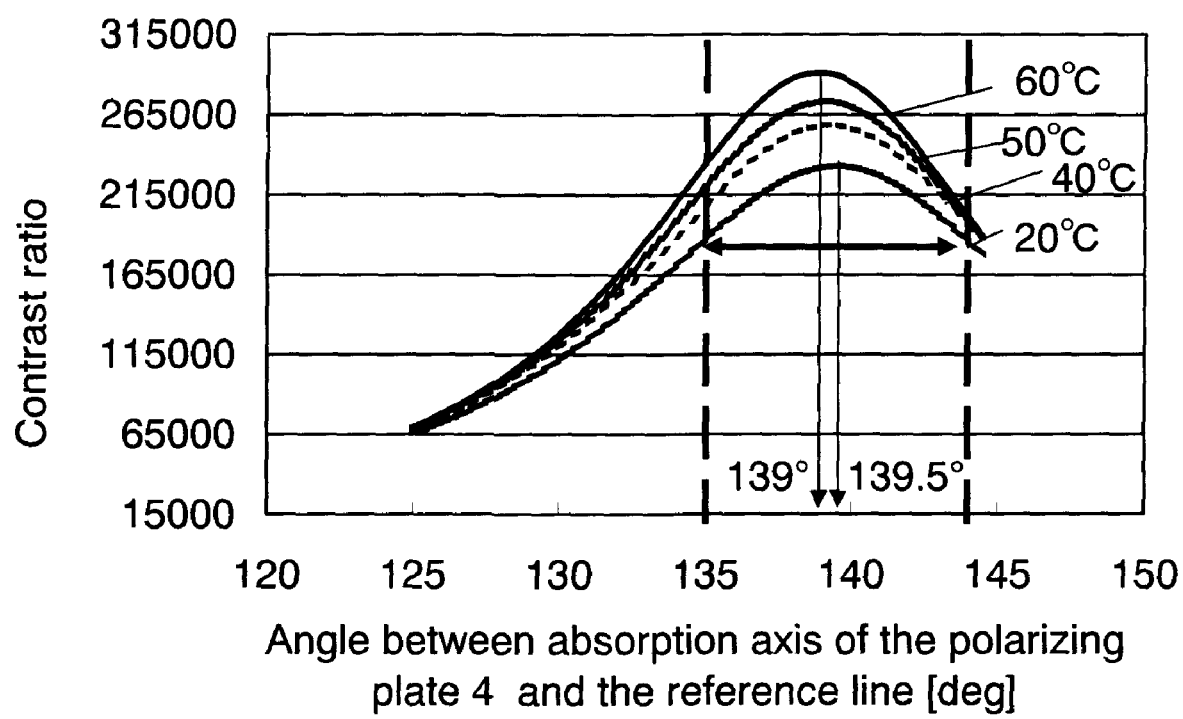
FIG. 19 is a graph showing an experiment result of the present invention.

FIG. 19 shows a result of a contrast ratio with respect to the angle between the absorption axis of the polarizing plate 4 and the reference line. The optical calculation was carried out with the angle between the absorption axis and the reference line ranging from 125° to 145°. In order to perform white display, a voltage of 6.5 V (ON voltage) was applied to the liquid crystal; on the other hand, in order to perform black display, a voltage of 0.6 V (OFF voltage) was applied to the liquid crystal. Then, the contrast ratio of the liquid crystal element was measured with the temperature of the VA liquid crystal set to 20° C., 25° C., 40° C., and 60° C.

It is understood from FIG. 19 that the contrast ratio differs depending on the temperature of the VA liquid crystal. For example, it is when the angle between the absorption axis of the polarizing plate 4 and the reference line is 139.5° that the contrast ratio is the maximum at 20° C. Moreover, it is when the angle between the absorption axis of the polarizing plate 4 and the reference line is 139° that the contrast ratio is the maximum at 60° C. It is understood from FIG. 19 that the angle between the absorption axis of the polarizing plate 4 and the reference line is 135° to 144°, that is, the angle between the absorption axis of the polarizing plate 4 and the absorption axis of the polarizing plate 3 is within 9°, preferably within 7°, in order to increase the contrast ratio so as to be higher than contrast ratio when the angle between the absorption axis of the polarizing plate 4 and the reference line is 135°.

It is understood that the contrast ratio is increased by displacing absorption axes of the stacked polarizing plates in this manner Moreover, it is understood that when the absorption axes of the stacked polarizing plates are displaced, the contrast ratio shows temperature dependency with respect to the angle of the absorption axis of the polarizing plate 4 at which the contrast ratio is the maximum.

Embodiment 4

Embodiment 4 shows results of optical calculation on temperature dependency with respect to a contrast ratio. Here, description is made of a method for fixing the contrast ratio without depending on the temperature while the stacked polarizing plates are displaced.

Figure 20:
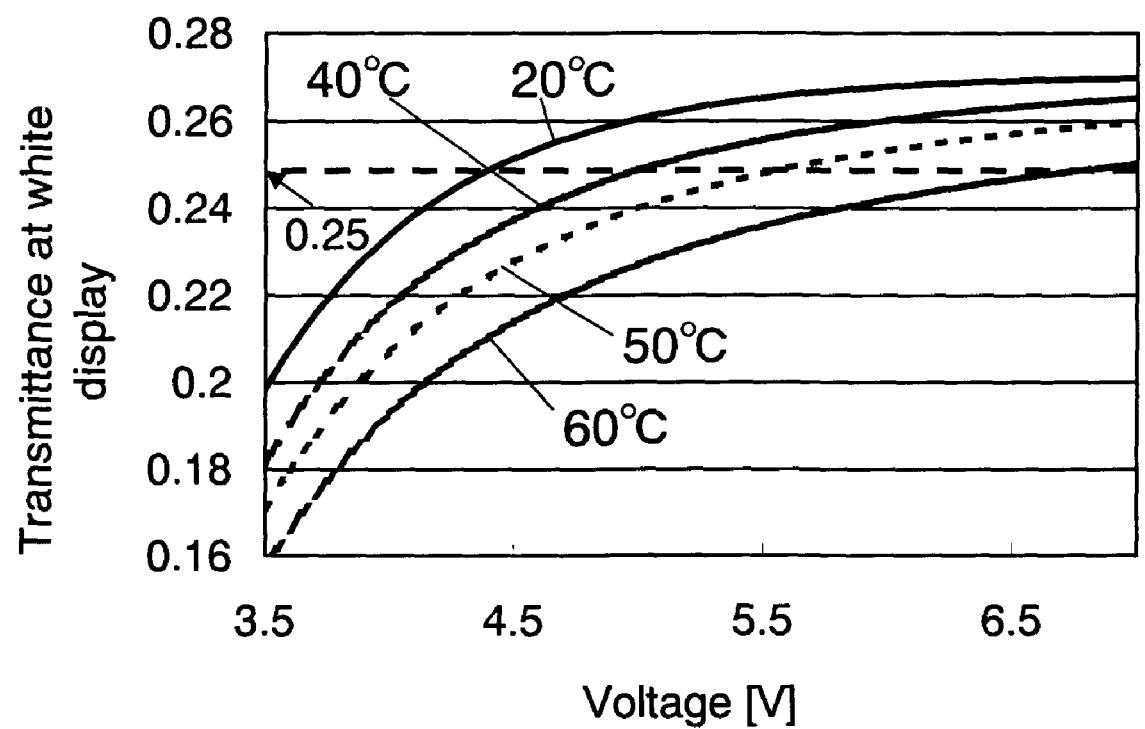
FIG. 20 is a graph showing an experiment result of the present invention.

FIG. 20 shows transmittance at white display with respect to an applied voltage when the angle between the reference line and the absorption axis of the polarizing plate 4 shown in FIG. 18 is 139°. It is understood that the transmittance at white display gets lower with the increase in temperature of the VA liquid crystal. In order to fix the contrast ratio with respect to the temperature of the VA liquid crystal, the transmittance at white display may be fixed. For example, the transmittance at white display may be fixed at 0.25.

Chart 5 shows specific values of a voltage applied to perform white display at each temperature of the VA liquid crystal.

CHART 5

| Temperature [° C.] | Applied Voltage [V] |
| --- | --- |
| 20 | 4.4 |
| 25 | 4.9 |
| 40 | 5.4 |
| 60 | 6.5 |

Figure 21:
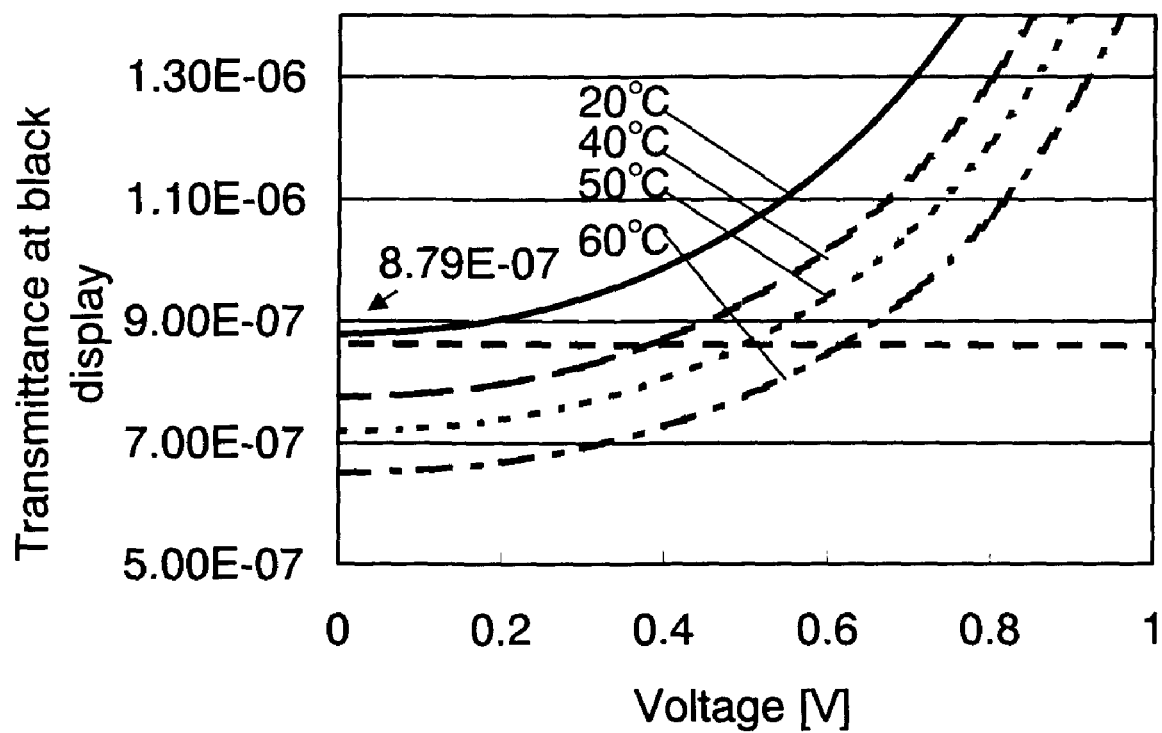
FIG. 21 is a graph showing an experiment result of the present invention.

Next, FIG. 21 shows transmittance at black display with respect to an applied voltage when the angle between the absorption axis of the polarizing plate 4 and the reference line is 139°. It is understood that the transmittance at black display gets lower with the increase in temperature of the VA liquid crystal. In order to fix the contrast ratio with respect to the temperature of the VA liquid crystal, the transmittance at black display may be fixed. For example, the transmittance at black display may be fixed at $8.79 \times 10^{-7}$.

Chart 6 shows specific values of a voltage applied to perform black display at each temperature of the VA liquid crystal.

CHART 6

| Temperature [° C.] | Applied Voltage [V] |
| --- | --- |
| 20 | 0 |
| 25 | 0.4 |
| 40 | 0.5 |
| 60 | 0.6 |

Figure 22:
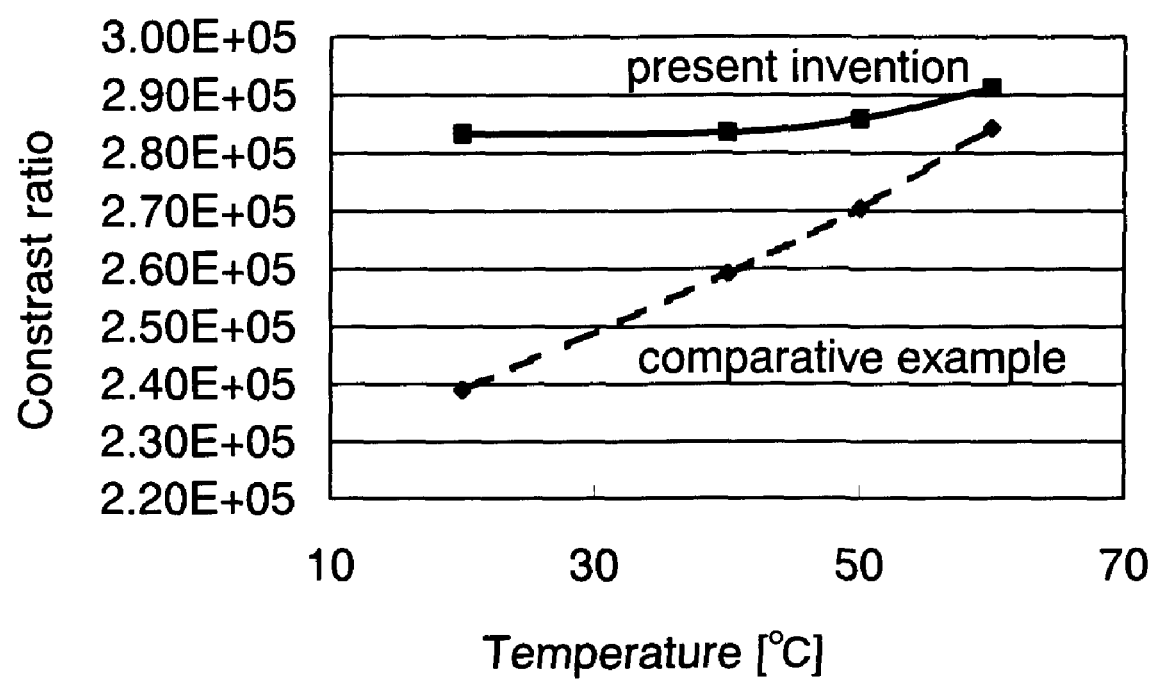
FIG. 22 is a graph showing an experiment result of the present invention.

Next, FIG. 22 shows results of plotting a contrast ratio with respect to the temperature of the VA liquid crystal. Also in this measurement, the polarizing plate 4 was provided with its absorption axis set at 139° to the reference line, i.e., the polarizing plate 4 was arranged displaced, so as to obtain a high contrast ratio. Moreover, as shown in Charts 5 and 6, the voltage applied to the liquid crystal element was controlled so that the transmittance at white display and the transmittance at black display were fixed with respect to the temperature of the VA liquid crystal. As a comparative example, a result of a comparative element which is arranged so that the angle between the absorption axis of the polarizing plate 4 and the reference line is 135° is shown. In the comparative element, regardless of the temperature, a voltage of 0 V was applied to perform black display and a voltage of 5 V was applied to perform white display.

Chart 7 shows structures of the liquid crystal element and the comparative element.

CHART 7

| Liquid crystal element of the present invention | |
| --- | --- |
| polarizing plate 4 | displacement absorption axis from 135° to 139° |
| polarizing plate 3 | absorption axis 135° |

CHART 7-continued

| retardation plate | — |
| liquid crystal | controlliing voltage in accordance with charts 5, 6 |
| retardation plate | — |
| polarizing plate 2 | absorption axis 45° |
| polarizing plate 1 | absorption axis 45° |

| Liquid crystal element of the comparative example | |
| --- | --- |
| polarizing plate 4 | absorption axis 135° |
| polarizing plate 3 | absorption axis 135° |
| retardation plate | — |
| liquid crystal | fixed voltage (0V, 5V) |
| retardation plate | — |
| polarizing plate 2 | absorption axis 45° |
| polarizing plate 1 | absorption axis 45° |

It is understood from FIG. 22 that a high contrast ratio can be obtained in the liquid crystal element of the present invention and a fixed contrast ratio can be obtained at temperatures of the VA liquid crystal ranging from 20° C. to 60° C. Although the contrast ratio is somewhat high at 60° C., this can be solved by specifically controlling a voltage when the transmittance at black display is controlled. On the other hand, it is understood that the comparative element has a low contrast ratio and the contrast ratio thereof changes depending on the temperature of the VA liquid crystal.

Thus, it is understood that the liquid crystal element of the present invention has a high contrast ratio. Although the contrast ratio changes depending on the temperature of the VA liquid crystal, it is understood that drive voltage is desirably controlled so as to maintain a fixed contrast ratio. In order to control the drive voltage, an element for detecting the transmittance may be provided in the display device and the drive voltage may be controlled based on a detection result. As the element for detecting the transmittance, a photosensor including an IC chip can be used. In the display device, an element for detecting temperature may be provided and the drive voltage may be controlled based on a detection result and the change in a contrast ratio with respect to the temperature of the liquid crystal element. As the element for detecting the temperature, a temperature sensor including an IC chip can be used. In this case, the element for detecting the transmittance and the element for detecting the temperature are preferably arranged so as to be hidden in the housing of the display device.

This application is based on Japanese Patent Application serial no. 2005-380220 filed in Japan Patent Office on Dec. 28, 2005, the entire contents of which are hereby incorporated by reference.

What is claimed is:

1. A display device comprising:
a first light-transmitting substrate;
a second light-transmitting substrate;
a display element sandwiched between the first light-transmitting substrate and the second light-transmitting substrate;
a first polarizing plate having a first transmission axis and a second polarizing plate having a second transmission axis; and
a third polarizing plate having a third transmission axis and a fourth polarizing plate having a fourth transmission axis,
wherein the first polarizing plate and the second polarizing plate are stacked outside the first light-transmitting substrate,
wherein the third polarizing plate and the fourth polarizing plate are stacked outside the second light-transmitting substrate,
wherein the second transmission axis is displaced so as to correspond to a minor-axis direction of an ellipse of elliptically-polarized light emitted from the first polarizing plate, and
wherein the third transmission axis and the fourth transmission axis are in a parallel nicol state.

2. The display device according to claim 1, wherein the first transmission axis and the third transmission axis are in a cross nicol state.

3. The display device according to claim 1, wherein the first transmission axis and the fourth transmission axis are displaced from a cross nicol state.

4. The display device according to claim 1, wherein the first polarizing plate and the second polarizing plate are arranged on a viewing side.

5. A display device comprising:
a first light-transmitting substrate;
a second light-transmitting substrate;
a display element sandwiched between the first light-transmitting substrate and the second light-transmitting substrate;
a first polarizing plate having a first transmission axis and a second polarizing plate having a second transmission axis;
a third polarizing plate having a third transmission axis and a fourth polarizing plate having a fourth transmission axis;
a first retardation plate between the first polarizing plate and the first light-transmitting substrate; and
a second retardation plate between the third polarizing plate and the second light-transmitting substrate,
wherein the first polarizing plate and the second polarizing plate are stacked outside the first light-transmitting substrate,
wherein the third polarizing plate and the fourth polarizing plate are stacked outside the second light-transmitting substrate,
wherein the second transmission axis is displaced so as to correspond to a minor-axis direction of an ellipse of elliptically-polarized light emitted from the first polarizing plate, and
wherein the third transmission axis and the fourth transmission axis are in a parallel nicol state.

6. The display device according to claim 5, wherein the first transmission axis and the third transmission axis are in a cross nicol state.

7. The display device according to claim 5, wherein the first transmission axis and the fourth transmission axis are displaced from a cross nicol state.

8. The display device according to claim 5, wherein the first polarizing plate and the second polarizing plate are arranged on a viewing side.

9. The display device according to claim 1, wherein each of the first polarizing plate, the second polarizing plate, the third polarizing plate and the fourth polarizing plate comprises TAC (triacetylcellulose), a mixed layer of PVA (polyvinyl alcohol) and iodine, and TAC.

10. The display device according to claim 1, wherein each of the first polarizing plate, the second polarizing plate, the third polarizing plate and the fourth polarizing plate comprises an inorganic material.

11. The display device according to claim 5, wherein each of the first polarizing plate, the second polarizing plate, the third polarizing plate and the fourth polarizing plate comprises TAC (triacetylcellulose), a mixed layer of PVA (polyvinyl alcohol) and iodine, and TAC.

12. The display device according to claim 5, wherein each of the first polarizing plate, the second polarizing plate, the third polarizing plate and the fourth polarizing plate comprises an inorganic material.

13. An electronic appliance having the display device according to claim 1, wherein the electronic appliance is one selected from the group consisting of a television set, a camera such as a digital camera and a digital video camera, a mobile phone set, a portable information terminal, a portable game machine, a monitor for a computer, a computer, an audio reproducing device, and an image reproducing device provided with a recording medium.

14. An electronic appliance having the display device according to claim 5, wherein the electronic appliance is one selected from the group consisting of a television set, a camera such as a digital camera and a digital video camera, a mobile phone set, a portable information terminal, a portable game machine, a monitor for a computer, a computer, an audio reproducing device, and an image reproducing device provided with a recording medium.

15. The display device according to claim 1, wherein the display element is a liquid crystal element.

16. The display device according to claim 5, wherein the display element is a liquid crystal element.

17. The display device according to claim 1, wherein an angle between the first transmission axis and the second transmission axis is within 7°.

18. The display device according to claim 5, wherein an angle between the first transmission axis and the second transmission axis is within 7°.

* * * * *